(12) United States Patent
Pittel et al.

(10) Patent No.: US 7,268,774 B2
(45) Date of Patent: Sep. 11, 2007

(54) TRACKING MOTION OF A WRITING INSTRUMENT

(75) Inventors: Arkady Pittel, Brookline, MA (US);
Ilya Schiller, Brookline, MA (US);
Sergey Liberman, Bedford, MA (US);
Garry Shleppi, Auburndale, MA (US);
Ethan A. Funk, Boston, MA (US);
Vladimir V. Subach, Lexington, MA (US); Andrew M. Goldman, Wakefield, MA (US); Leonid Reznik, Sudbury, MA (US); Simon Selitsky, Lexington, MA (US); Mario A. Stein, Natick, MA (US)

(73) Assignee: Candledragon, Inc., Brookline, MA (US)

( * ) Notice: Subject to any disclaimer, the term of this patent is extended or adjusted under 35 U.S.C. 154(b) by 35 days.

(21) Appl. No.: 10/623,284

(22) Filed: Jul. 17, 2003

(65) Prior Publication Data

US 2005/0073508 A1    Apr. 7, 2005

Related U.S. Application Data

(63) Continuation of application No. 09/698,471, filed on Oct. 27, 2000, now abandoned, which is a continuation-in-part of application No. 09/376,837, filed on Aug. 18, 1999, now Pat. No. 6,577,299.

(60) Provisional application No. 60/230,912, filed on Sep. 13, 2000, provisional application No. 60/195,491, filed on Apr. 10, 2000, provisional application No. 60/161,752, filed on Oct. 27, 1999, provisional application No. 60/142,201, filed on Jul. 1, 1999, provisional application No. 60/142,200, filed on Jul. 1, 1999, provisional application No. 60/096,988, filed on Aug. 18, 1998.

(51) Int. Cl.
*G09G 5/00* (2006.01)

(52) U.S. Cl. .................. 345/179; 345/182; 345/183; 345/179; 178/18.01; 178/18.02; 178/19.02; 178/19.05; 178/19.03; 178/19.04

(58) Field of Classification Search ............... 345/179, 345/182–183; 178/18.01–18.02, 19.02, 19.05
See application file for complete search history.

(56) References Cited

U.S. PATENT DOCUMENTS 3,376,551 A    4/1968    Armbruster
3,559,307 A    2/1971    Barrekette et al.

(Continued)

FOREIGN PATENT DOCUMENTS

EP    0 202 468    11/1986

(Continued)

OTHER PUBLICATIONS

Conant, R., et al., "A Raster-Scanning Full-Motion Video Display Using Polysilicon Micromachined Mirrors", *Sensors and Actuators A: Physical*, 83(1):291-296, May 2000.

(Continued)

*Primary Examiner*—Richard Hjerpe
*Assistant Examiner*—Leonid Shapiro
(74) *Attorney, Agent, or Firm*—Fish & Richardson P.C.

(57) ABSTRACT

Motion of a writing instrument is tracked from sensors located in the vicinity. The signals generated from the sensors are processed and used in a wide variety of ways.

40 Claims, 33 Drawing Sheets

U.S. PATENT DOCUMENTS

Figure 1:
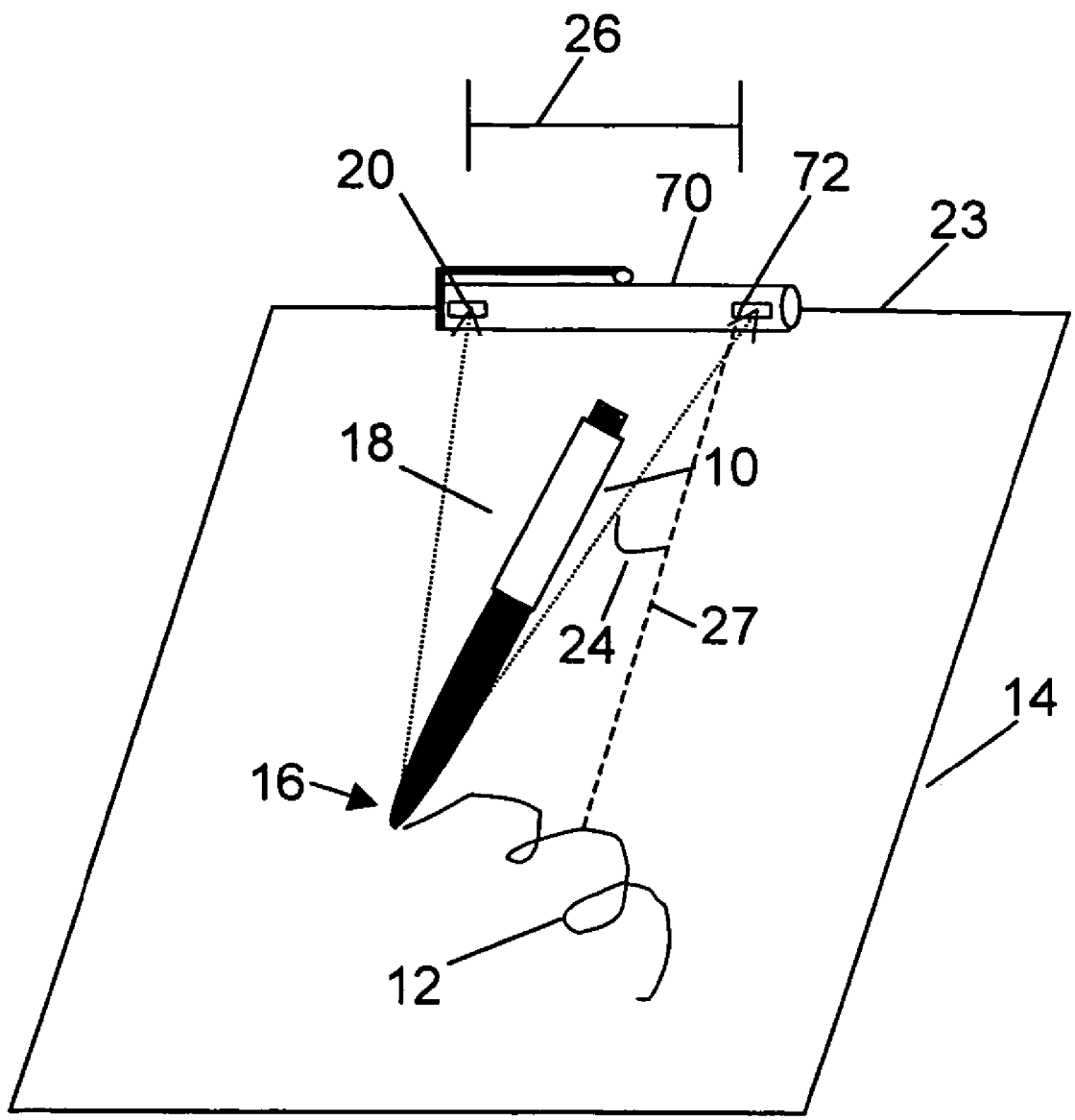

| | | |
|---|---|---|
| 3,581,099 A | 5/1971 | Franke |
| 3,801,741 A | 4/1974 | Ablett |
| 3,915,015 A | 10/1975 | Crane et al. |
| 4,124,838 A | 11/1978 | Kiss |
| 4,131,880 A | 12/1978 | Siy et al. |
| 4,550,250 A | 10/1985 | Mueller et al. |
| 4,650,335 A * | 3/1987 | Ito et al. ............ 356/398 |
| 4,682,016 A * | 7/1987 | Inoue ............ 235/462.49 |
| 4,688,933 A | 8/1987 | Lapeyre |
| 4,705,942 A | 11/1987 | Budrikis et al. |
| 4,710,760 A | 12/1987 | Kasday |
| 4,751,741 A | 6/1988 | Mochinaga et al. |
| 4,782,328 A | 11/1988 | Denlinger |
| 4,806,707 A | 2/1989 | Landmeier |
| 4,883,926 A | 11/1989 | Baldwin |
| 4,891,474 A | 1/1990 | Kelly |
| 4,896,965 A | 1/1990 | Goff et al. |
| 4,936,683 A | 6/1990 | Purcell |
| 5,026,153 A | 6/1991 | Suzuki et al. |
| 5,053,757 A | 10/1991 | Meadows |
| 5,121,441 A | 6/1992 | Chefalas et al. |
| 5,166,668 A | 11/1992 | Aoyagi |
| 5,185,638 A | 2/1993 | Conzola et al. |
| 5,198,877 A | 3/1993 | Schulz |
| 5,215,397 A | 6/1993 | Taguchi et al. |
| 5,227,622 A | 7/1993 | Suzuki |
| 5,227,732 A * | 7/1993 | Hong ............ 327/558 |
| 5,239,139 A * | 8/1993 | Zuta ............ 178/19.02 |
| 5,247,137 A | 9/1993 | Epperson |
| 5,296,838 A | 3/1994 | Suzuki |
| 5,301,222 A | 4/1994 | Fujiwara |
| 5,308,936 A | 5/1994 | Biggs et al. |
| 5,313,542 A | 5/1994 | Castonguay |
| 5,317,140 A | 5/1994 | Dunthorn |
| 5,347,477 A | 9/1994 | Lee |
| 5,371,516 A | 12/1994 | Toyoda et al. |
| 5,434,371 A | 7/1995 | Brooks |
| 5,453,762 A | 9/1995 | Ito et al. |
| 5,483,261 A | 1/1996 | Yasutake |
| 5,517,579 A | 5/1996 | Baron et al. |
| 5,525,764 A | 6/1996 | Junkins et al. |
| 5,546,538 A | 8/1996 | Cobbley et al. |
| 5,548,092 A | 8/1996 | Shriver |
| 5,572,607 A * | 11/1996 | Behrends ............ 382/274 |
| 5,587,558 A | 12/1996 | Matsushima |
| 5,612,720 A | 3/1997 | Ito et al. |
| 5,629,499 A | 5/1997 | Flickinger et al. |
| 5,652,412 A | 7/1997 | Lazzouni et al. |
| 5,661,761 A * | 8/1997 | Iwamatsu ............ 375/344 |
| 5,793,361 A | 8/1998 | Kahn et al. |
| 5,805,719 A | 9/1998 | Pare, Jr. et al. |
| 5,818,424 A | 10/1998 | Korth |
| 5,825,921 A | 10/1998 | Dulong |
| 5,831,601 A | 11/1998 | Vogeley et al. |
| 5,874,947 A | 2/1999 | Lin |
| 5,900,943 A | 5/1999 | Owen |
| 5,902,968 A | 5/1999 | Sato et al. |
| 5,945,981 A | 8/1999 | Paull et al. |
| 5,963,194 A | 10/1999 | Umeda et al. |
| 5,996,956 A | 12/1999 | Shawver |
| 6,014,129 A | 1/2000 | Umeda et al. |
| 6,038,333 A | 3/2000 | Wang |
| 6,055,552 A | 4/2000 | Curry |
| 6,100,538 A * | 8/2000 | Ogawa ............ 250/559.29 |
| 6,124,848 A | 9/2000 | Ballare et al. |
| 6,137,908 A | 10/2000 | Rhee |
| 6,181,329 B1 * | 1/2001 | Stork et al. ............ 345/179 |
| 6,191,778 B1 | 2/2001 | Chery et al. |
| 6,236,753 B1 | 5/2001 | Inamoto |
| 6,243,165 B1 * | 6/2001 | Norita et al. ............ 356/337 |
| 6,326,956 B1 | 12/2001 | Jaeger et al. |
| 6,333,716 B1 | 12/2001 | Pontoppidan |
| 6,335,727 B1 | 1/2002 | Morishita et al. |
| 6,344,848 B1 | 2/2002 | Rowe et al. |
| 6,348,914 B1 | 2/2002 | Tuli |
| 6,377,238 B1 | 4/2002 | McPheters |
| 6,392,821 B1 | 5/2002 | Benner, Jr. |
| 6,414,673 B1 * | 7/2002 | Wood et al. ............ 345/173 |
| 6,441,362 B1 | 8/2002 | Ogawa |
| 6,490,563 B2 | 12/2002 | Hon et al. |
| 6,501,061 B1 * | 12/2002 | Kitai et al. ............ 250/205 |
| 6,525,715 B2 | 2/2003 | Uchiyama et al. |
| 6,526,351 B2 | 2/2003 | Whitham |
| 6,567,078 B2 | 5/2003 | Ogawa |
| 6,614,422 B1 | 9/2003 | Rafii et al. |
| 6,633,671 B2 | 10/2003 | Munich et al. |
| 6,647,145 B1 | 11/2003 | Gay |
| 6,760,009 B2 | 7/2004 | Omura et al. |
| 6,811,264 B2 | 11/2004 | Raskar et al. |
| 6,856,349 B1 * | 2/2005 | Trevino ............ 348/302 |
| 6,897,854 B2 | 5/2005 | Cho et al. |
| 7,006,134 B1 | 2/2006 | Arai et al. |
| 7,054,045 B2 | 5/2006 | McPheters et al. |
| 7,091,959 B1 | 8/2006 | Clary |
| 2001/0030668 A1 | 10/2001 | Erten et al. |
| 2002/0118181 A1 | 8/2002 | Sekendur |
| 2002/0163511 A1 | 11/2002 | Sekendur |
| 2003/0122804 A1 | 7/2003 | Yamazaki et al. |
| 2005/0128183 A1 | 6/2005 | McGreevy |
| 2005/0128184 A1 | 6/2005 | McGreevy |
| 2006/0077188 A1 | 4/2006 | Byun |

FOREIGN PATENT DOCUMENTS

| | | |
|---|---|---|
| EP | 0 717 368 | 6/1996 |
| EP | 0 865 192 | 9/1998 |
| EP | 0 869 690 | 10/1998 |
| FR | 2 650 904 | 2/1991 |
| JP | A S62-243022 | 10/1987 |
| JP | A H07-234105 | 9/1995 |
| JP | A H08-506193 | 7/1996 |
| JP | A H09-319501 | 12/1997 |
| JP | A H11-21925 | 1/1999 |
| JP | A H11-84227 | 3/1999 |
| WO | WO94/09447 | 4/1994 |
| WO | WO94/18663 | 8/1994 |
| WO | WO95/02163 | 1/1995 |
| WO | WO97/16799 | 5/1997 |
| WO | WO98/44316 | 10/1998 |
| WO | WO00/011596 | 3/2000 |
| WO | WO01/031570 | 5/2001 |
| WO | WO01/077796 | 10/2001 |
| WO | WO05/058177 | 6/2005 |

OTHER PUBLICATIONS

Craft, D.J., et al., "Accelerometer Pen", *IBM Technical Disclosure Bulletin*, 16(12):4070, May 1974.

Du, H., et al., "A Virtual Keyboard Based on True-3D Optical Ranging", *Proceedings of the British Machine Vision Conference*, Oxford, U.K., vol. 1, pp. 220-229, Sep. 2005.

Narayanaswamy, S., et al., "Using data on digital cellular and PCS voice networks", *Bell Labs Technical Journal*, 3(2):58-75, Apr. 1998.

Romano, B., "Microsoft's latest is flat-out impressive", *The Seattle Times*, 3 pages, Jul. 19, 2006.

Office Action from Japanese Patent Office.

\* cited by examiner

TRACKING MOTION OF A WRITING INSTRUMENT

This application is a continuation of and claims the benefit of priority from U.S. application Ser. No. 09/698,471, filed October 27, 2000, now abandoned, which claims the benefit of the priority filing of U.S. provisional application Ser. No. 60/161,752, filed Oct. 27, 1999, U.S. provisional application Ser. No. 60/195,491, filed Apr. 10, 2000, and U.S. provisional application Ser. No. 60/230,912, filed Sep. 13, 2000, and which was a continuation-in-part of U.S. application Ser. No. 09/376,837, filed Aug. 18, 1999 , now U.S. Pat. No. 6.577,299, which claims the benefit of the priority filing of U.S. provisional application Ser. No. 60/142,201, filed Jul. 1, 1999, U.S. provisional application Ser. No. 60/142,200, filed Jul. 1, 1999, and U.S. provisional application Ser. No. 60/096,988, filed Aug. 18, 1998. The disclosures of the prior applications are considered part of (and are incorporated by reference in) the disclosure of this application.

BACKGROUND

This invention relates to tracking motion of a writing instrument.

By tracking the motion of a pen, for example, as it is used to write or draw on paper, it is possible to capture and reproduce electronically what is being written or drawn. Motion of a stylus that does not leave a mark on a writing surface can also be tracked.

In some proposed approaches, the surface on which the pen is moving may have an array of pixels or other sensing locations each of which responds when the pen is at that location.

In other techniques, the pen tracking is done entirely by electronics mounted in the pen. In some schemes, the moving pen communicates with stationary sensors that are separate from the pen, and triangulation algorithms are used to track the motion.

SUMMARY

In general, in one aspect, the invention features a method that includes conveying light from a moving writing instrument as an indication of the location and path of the writing instrument on a two dimensional writing surface; sensing the light at two or more sensors and generating a sequence of signals representative of the sensed light; and applying a technique to reduce the effect of variations of the light intensity in a third dimension with respect to the generated signals.

Implementations of the invention may include one or more of the following features. The technique may be based on optics that are configured to enhance the uniformity of signal response of the sensors. The lens may be a spherical lens or an aspheric lens. The sensors may be arrays of sensitive pixel elements or analog sensors. The technique may be based on algorithmic processing of the generated signals. The algorithmic processing may include linearizing the signal response of the sensors based on parameters associated with the writing instrument. The technique may be implemented in digital hardware or in analog circuitry. The algorithmic technique may reduce the effect of variations of the light intensity based on other than dimensional effects. The signals may be grouped in frames, and the signal processing technique may include processing of multiple frames to cancel noise. The light conveyed from the moving writing instrument may be modulated at a frequency related to the rate at which the signals are generated by the sensors, and the sensor signals may be chopped at the frequency of modulation. Opposite gains may be applied to each of the chopped signals depending on the on or off state of the light conveyed from the writing instrument that corresponds to the signals. The frame rate may be varied. The chopped signals may be integrated over time. The light conveyed from the writing instrument may include a strong short pulse imposed at on the modulation frequency, a phase lock loop may determine the modulation frequency from the sensor signals, and the sensor signal may be sampled at the times triggered by the phase lock loop during the duration of the strong short pulse. The characteristics of the conveyed light may be used for synchronization between the writing instrument and the sensors. The conveyed light may include periods of lower frequency modulation and bursts of higher frequency modulation, and the sensor signal associated with the higher frequency bursts may be used to lock onto a modulation clock.

In general, in another aspect, the invention features a method that includes conveying light from a moving writing instrument in a time-changing pattern of directions, sensing the light at two or more sensors located at two or more different locations spaced from the writing instrument, and determining the location of the writing instrument by detecting a phase difference between signals measured at the two or more sensors.

Implementations of the invention may include one or more of the following features. The time-changing pattern of directions may include a rotating pattern with respect to an X-Y plane on which the writing instrument is moving. The signal radiated in the positive X direction may be in phase quadrature to the signal radiated in the Y direction.

In general, in another aspect, the invention features apparatus that includes sensors configured to receive light from a writing instrument moving across an X-Y writing surface, the light having variations in intensity along a Z-axis normal to the writing surface, and optics configured to enhance optical power of the light received from the writing instrument.

Implementations of the invention may include one or more of the following features. The optics may be a ball lens or an aspherical lens. The optics may include a single spherical lens and the lens and the corresponding sensor may be together configured to enhance the optical power of light received at large angles or longer distances or at disadvantageous positions of the writing instrument. The optics may include a special lens configured to enhance optical power of the light received from a location on the X-Y surface that is beyond a predetermined position. The optics may include two cylindrical lenses, one nearer the sensor to project light horizontally onto sensor, and the other positioned to collect light in the Z-axis dimension, the other lens having a body that is bent around the first lens. The algorithmic processes may enhance the immunity of the signals to variations in the intensity of the received light caused by distance from or tilt of the writing instrument. The processes may determine the integral power of the overall signal distribution on the sensor and calculate a subpixel position based on half of the integral power position. The processes may use a polynomial approximation on the signal distribution and calculate a subpixel position as a position of approximated maximum. The calibration procedure may produce parameters to be used in combination with data from the sensors. The calibration parameters may correct for manufacturing deficiencies of the optics and the sensors, and the algorithmic processes may use a straight triangulation technique to determine a position of the writing instrument. The calibration parameters may correct for manufacturing deficiencies of the optics and sensors and the algorithmic processes may determine the position of the writing instrument using polynomial series, where coefficients in these polynomials are determined during the calibration procedure.

In general, in another aspect, the invention features a method that includes receiving light from a moving writing instrument at a an array of sensing elements of a sensor, reading the sensing elements in sequence to generate a sequence of signals indicative of light sensed by the elements of the array, and resetting each of the elements after it is read and before at least some of the other elements in the array are read.

Implementations of the invention may include one or more of the following features. The array may include a CMOS or CCD position sensor. All of the elements may be read before all of the elements are reset.

In general, in another aspect, the invention features a method that includes determining a sequence of three-dimensional positions of the moving writing instrument based on the signals.

In general, in another aspect, the invention features the combination of a writing instrument having an elongated housing configured to be hand-held, a light source in the housing, and a lens in the housing configured to receive light from the light source and to convey the light through a free-air path to optical sensors spaced from the writing instrument, the lens being configured to be semi-reflective.

In general, in another aspect of the invention, the light source includes an array of light sources arranged around an axis of the writing instrument and configured to emit light in a direction normal to the axis.

Implementations of the invention may include one or more of the following features. The lens may be configured to internally reflect and concentrate the light and to emit it by reflection from a reflective external surface of the lens. The lens may have a cylindrical body having an upper surface that receives the light and a lower annular surface that reflects the light toward the optical sensors. The reflective external surface may include a conical surface oriented at a 45 certain degree angle to a longitudinal axis of the writing instrument. The light source in the pen may include LEDs arranged in a ring.

In general, in another aspect, the invention features a device configured to turn the light source on and off in response to a user applying pressure from the writing instrument to a writing surface, the device being configured so that an amount of pressure required to trigger the device is not so large as to disrupt normal writing motion of the writing instrument on the writing surface.

Implementations of the invention may include one or more of the following features. The writing instrument may include a ballpoint cartridge having a writing point and the device may be positioned at the opposite end of the cartridge from the writing point. The device may be a switch or a pressure sensor.

In general, in another aspect, the invention features a holder having a receptacle for receiving at least a portion of the writing instrument for storage of the writing instrument, the writing instrument and the holder containing respective elements that enable wireless transmission of signals associated with motion of the writing instrument and tracking of the writing motion based on the signals.

In implementations of the invention the holder may be a pen cap and may include a clip configured to attach the holder to a stack of pages or to a notebook. The holder may include at least two light sensors and a processor that processes signals from the light sensors to determine a sequence of positions of the writing instrument. The holder may include a receptacle for holding the writing instrument and for enabling recharging of batteries in the writing instrument.

In general, in another aspect, the invention features an element that enables wireless transmission of a signal associated with motion of the writing instrument and tracking of the writing motion based on the signal, the element being built into a cell phone, a PDA, a webpad, or a clipboard.

In general, in another aspect, the invention features, a holder that has a mechanism for attaching the holder to a writing substrate in an orientation that enables the elements to be used in conjunction with the wireless transmission. The clipping mechanism may include a switch to activate functions of a processor in the holder when the clipping mechanism is manipulated.

In general, in another aspect, the invention features, a holder that includes a receptacle for the writing instrument and a recharging circuit connected to recharge the battery when the writing instrument is in the receptacle.

In general, in another aspect, the invention features a CMOS sensor adapted to receive light associated with motion of a writing instrument and to provide signals indicative of an angle of receipt of the light with respect to a known direction, and a lens aligned to direct the received light to the CMOS array.

In implementations of the invention, the lens may be optimized for collection of light from an area in which the motion of the writing instrument occurs. The lens may be a field lens or a Fresnel lens. The lens system may be configured to collect light in a dimension normal to a plane of motion of the writing instrument and to project the light onto the sensor in a direction parallel to the plane of motion.

In general, in another aspect, the invention features calibrating by positioning a writing instrument at a succession of positions on a writing surface, generating signals at sensors from light received from the writing instruments at the succession of positions, and determining calibration parameters for the writing instrument for use in calibrating a process that determines the positions of the writing instrument as it is being moved.

In implementations of the invention, the calibration parameters may include coefficients used in polynomial series that are part of the position determining process.

In implementations of the invention, the positions do not lie on a regular rectangular grid.

In general, in another aspect, the invention features (1) identifying locations on a writing surface that correspond to input elements to be entered into an electronic device, the writing surface being non-electronic and separate from the electronic device, (2) using a writing instrument to point to selected ones of the identified locations corresponding to input elements to be entered, and (3) sensing the locations at which the writing instrument is pointing and entering the corresponding data into the electronic device.

In implementations of the invention, the writing surface includes a sheet of paper, the input elements comprise characters of language or commands that are printed on the writing surface.

In general, in another aspect, the invention features moving a writing instrument across a non-electronic writing surface to indicate a path, and remotely sensing the path and generating signals for use in entering the path into an electronic device that is separate from the writing surface.

In general, in another aspect, the invention features modulating light that is conveyed from a moving writing instrument to light sensors spaced from the writing instrument at a predetermined frequency, and using a phase locked loop associated with the sensors to lock onto the phase of the modulated light.

In general, in another aspect, the invention features, circuitry for tracking writing motion of a writing instrument using wireless transmission of signals between the writing instrument and a stationary element, the stationary element including a main processor and a separate preprocessor, the preprocessor being connected to perform at least data capture with respect to motion of the writing instrument, the main processor being connected to perform at least data communication with respect to the tracking.

In implementations of the invention the preprocessor may also be connected to perform user interface functions and sub-pixel data storage and the main processor may also connected to perform background cancellation and sub-pixel calculation.

In general, in another aspect, the invention features a reflective element configured to reflect light received from outside of the writing instrument to the sensor for use in tracking motion of the writing instrument.

In implementations of the invention, the reflective element may reflect light to the sensor when the writing instrument is being used for writing and disable the reflective element from reflecting light to the sensor when the writing instrument is not being used for writing.

In general, in another aspect, the invention features receiving light from a moving writing instrument at a light sensor having an array of sensitive pixel elements, and determining the location in the array at which the maximum intensity of light has been received from the writing instrument, the location being determined with sub-pixel accuracy.

In implementations of the invention, the sub-pixel location is determined by determining the integral pixel location that is closest to the subpixel location, and finding a fractional center of gravity of a subarray that is centered on the integral pixel location.

In general, in another aspect, the invention features indicating locations on a non-electronic surface that correspond to inputs to an electronic device, and detecting the locations and inputting them into the electronic device.

In general, in another aspect, the invention features a clip for clipping paper on which the writing instrument is to be moved to the sensor.

In implementations of the invention the mechanism may be part of a clipboard or a notebook, the clip may include a mechanism that enables a user to cause the clip to grip or to release the paper. The clip may include an activation button and a spring and a lever operated by the button. The lever may be configured to rotate in response to the button. The button may be configured to be pushed or pulled. Other advantages and features will become apparent from the following description and from the claims.

DESCRIPTION

Figure 2:
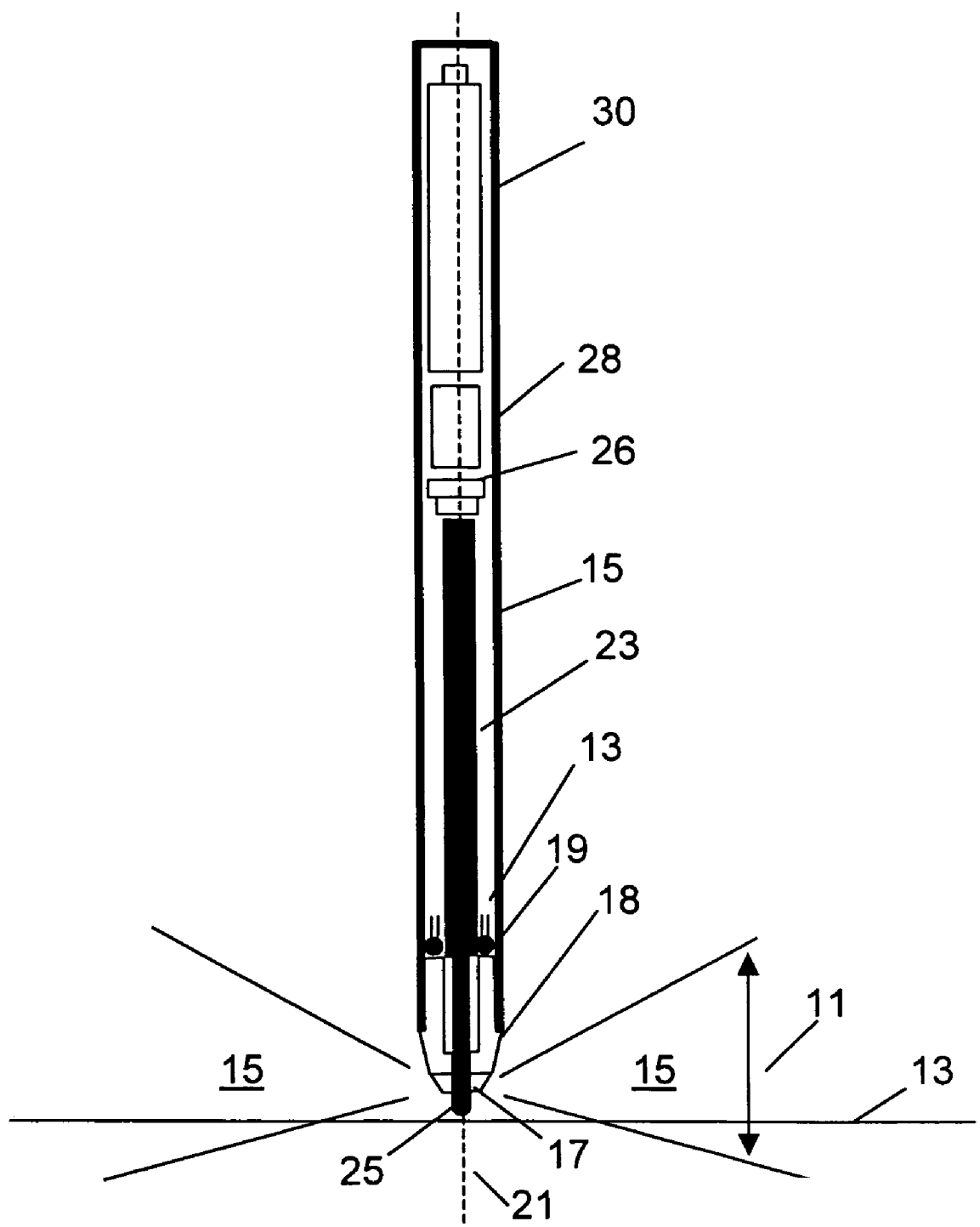
Figure 3:
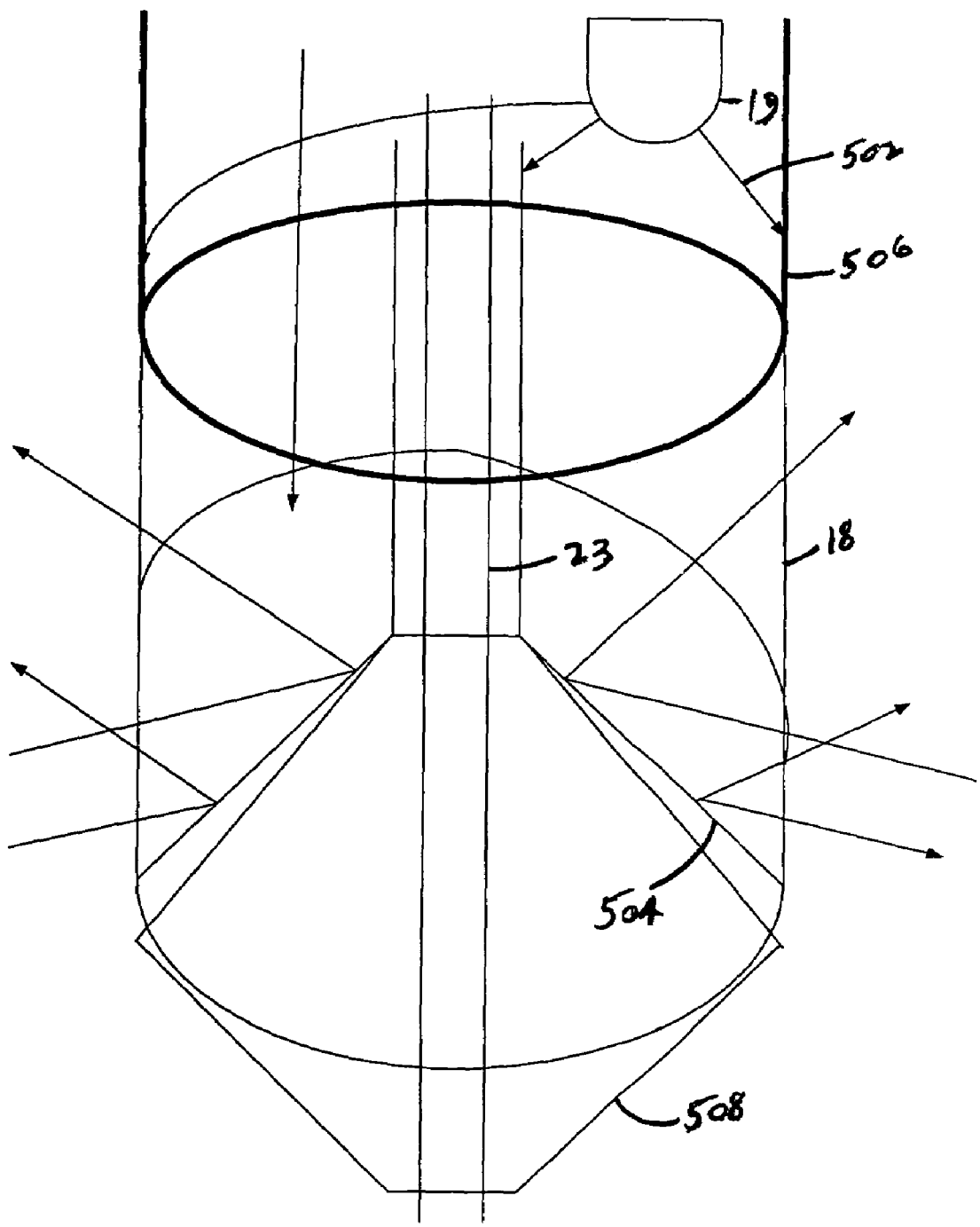
Figure 4:
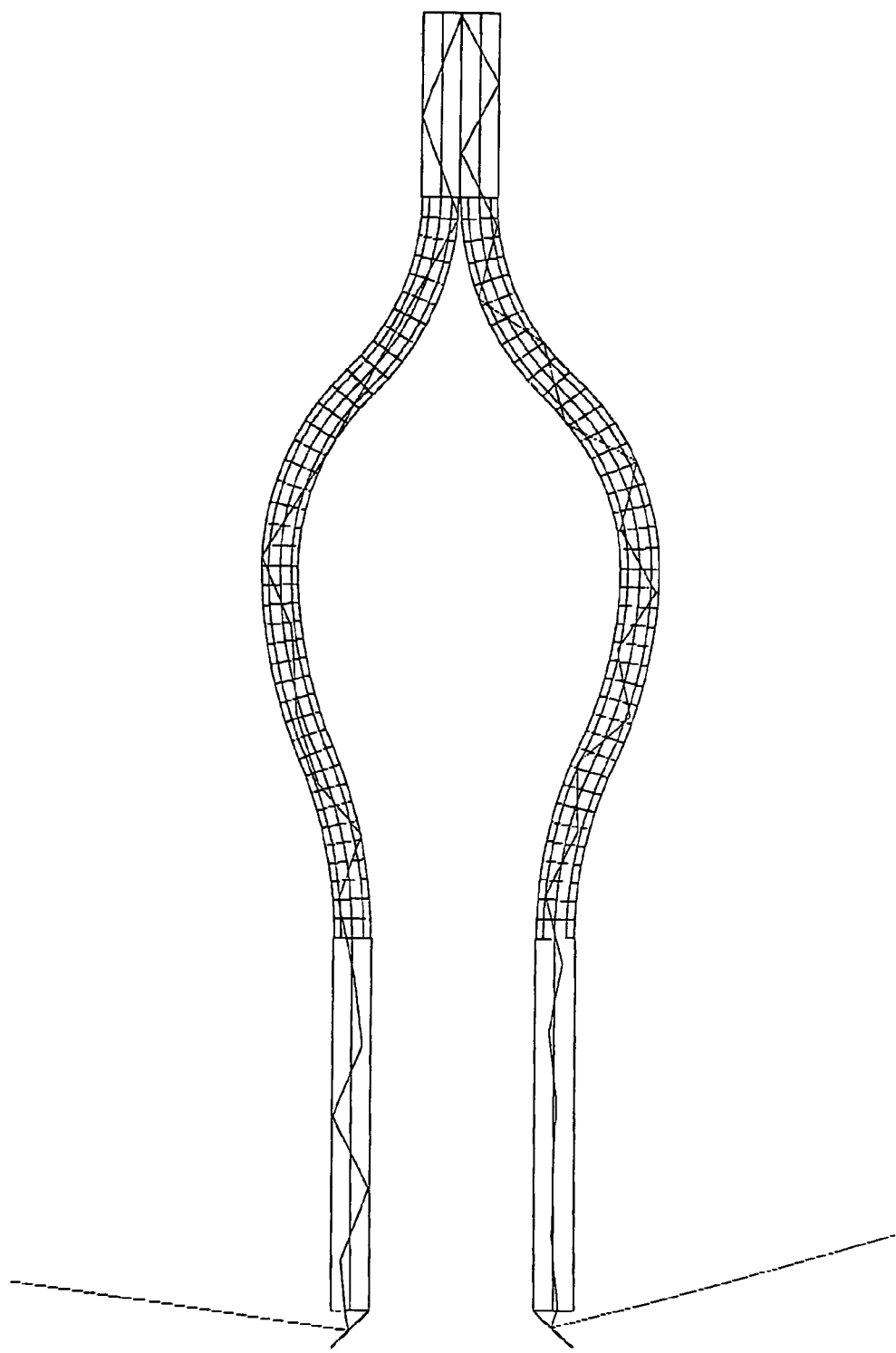
Figure 5:
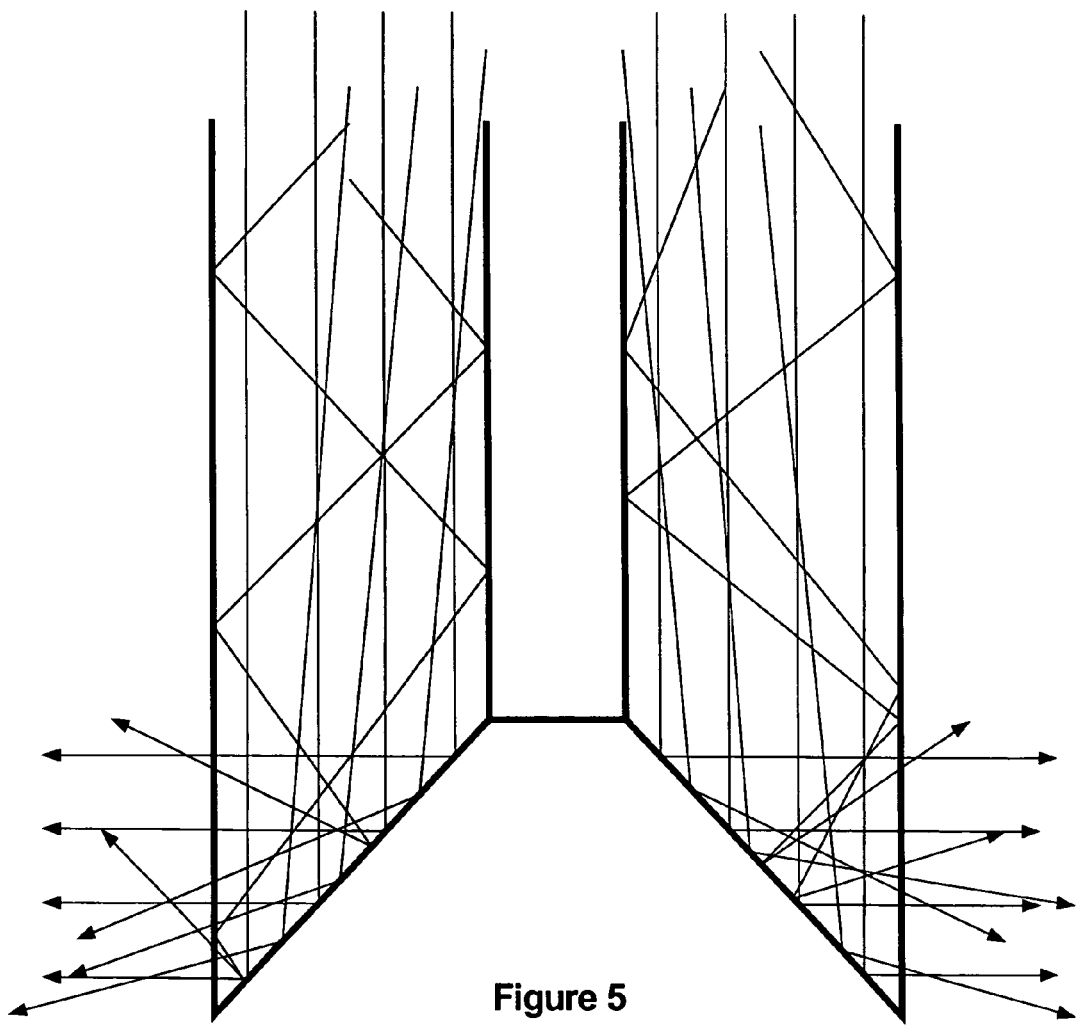
Figure 6:
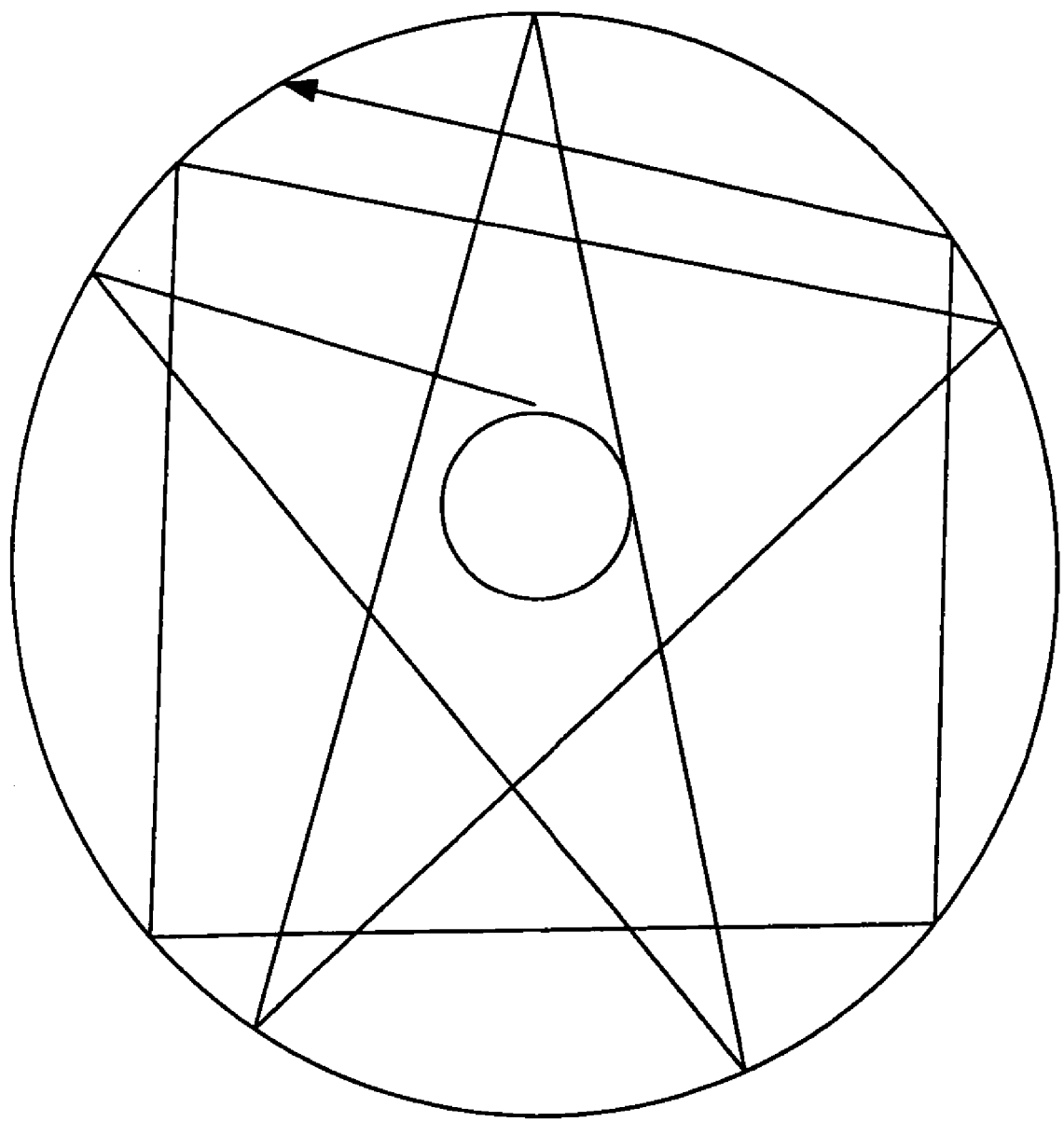
Figure 7:
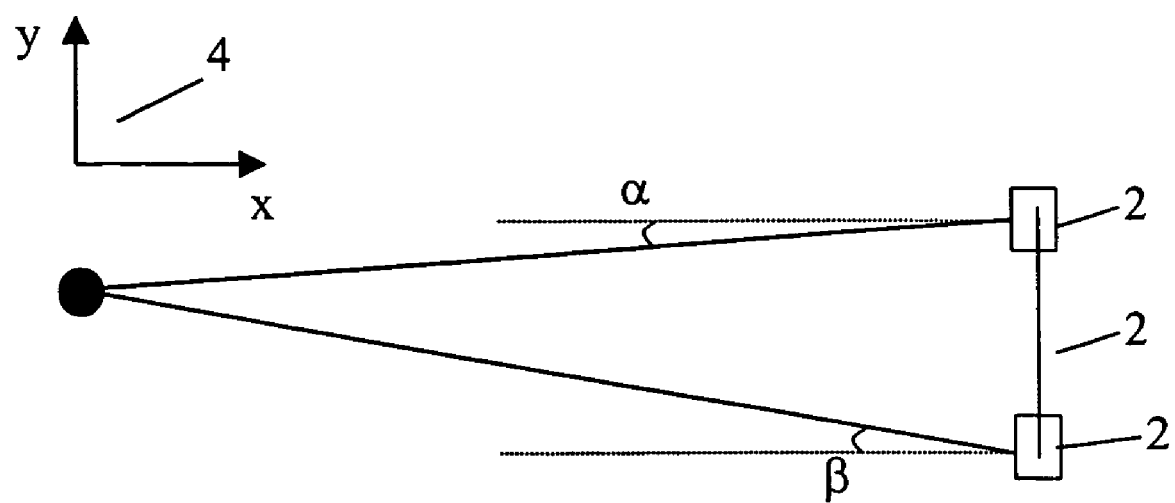
Figure 8:
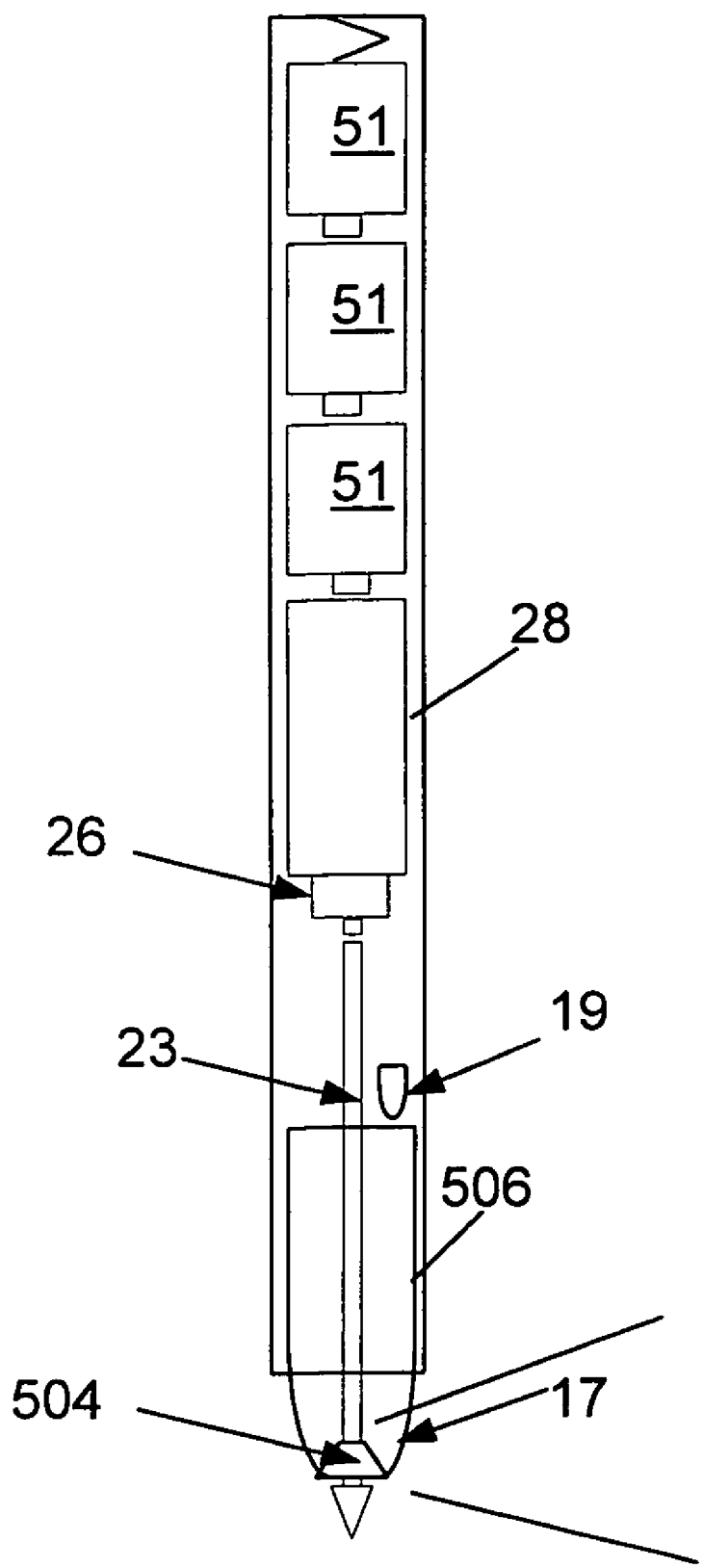
Figure 9:
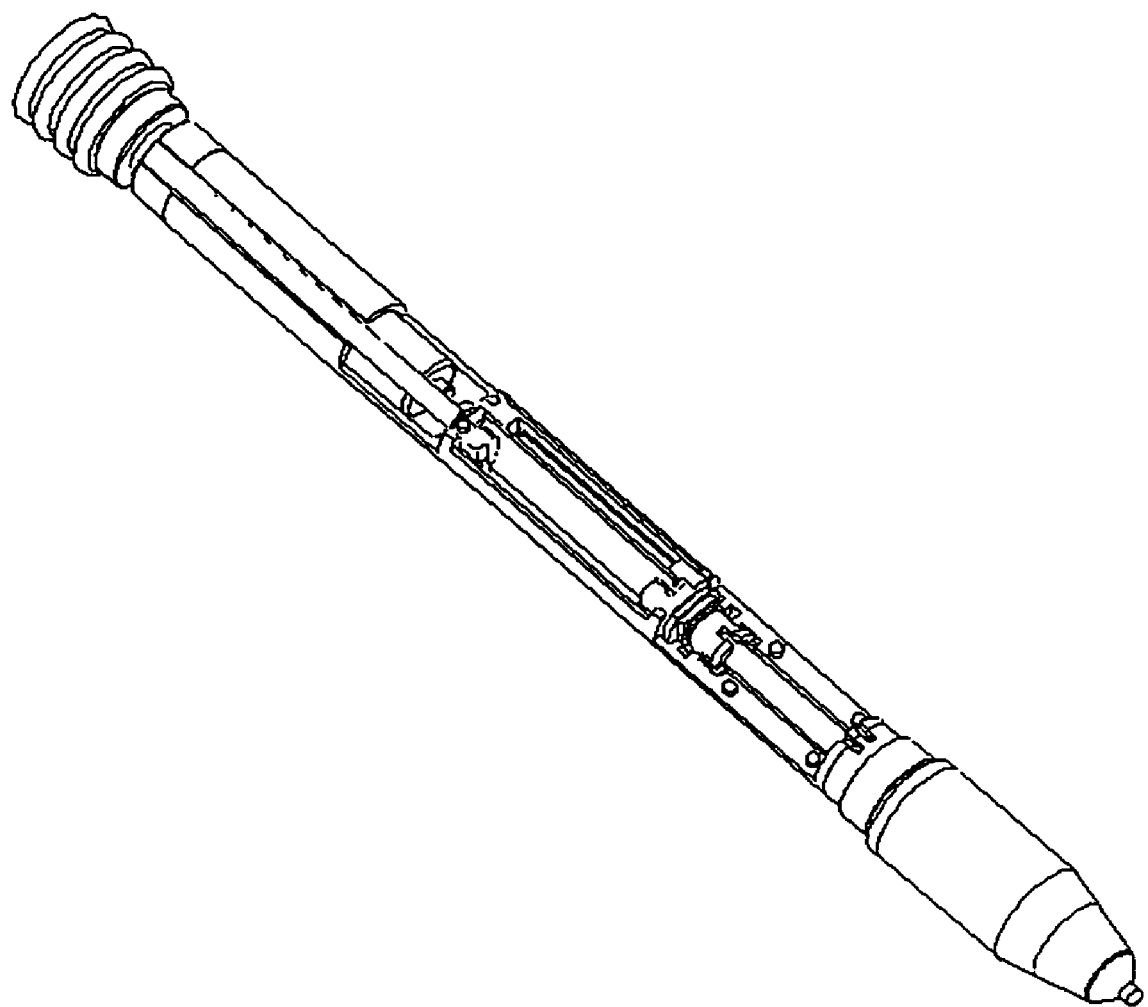
Figure 10:
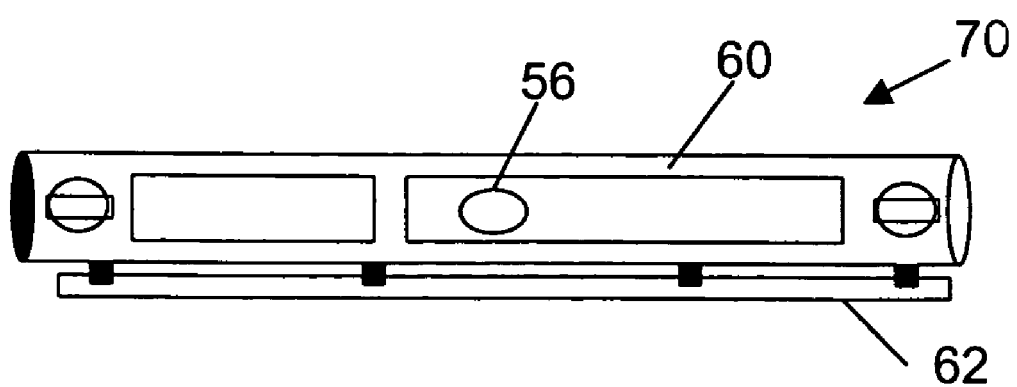
Figure 11:
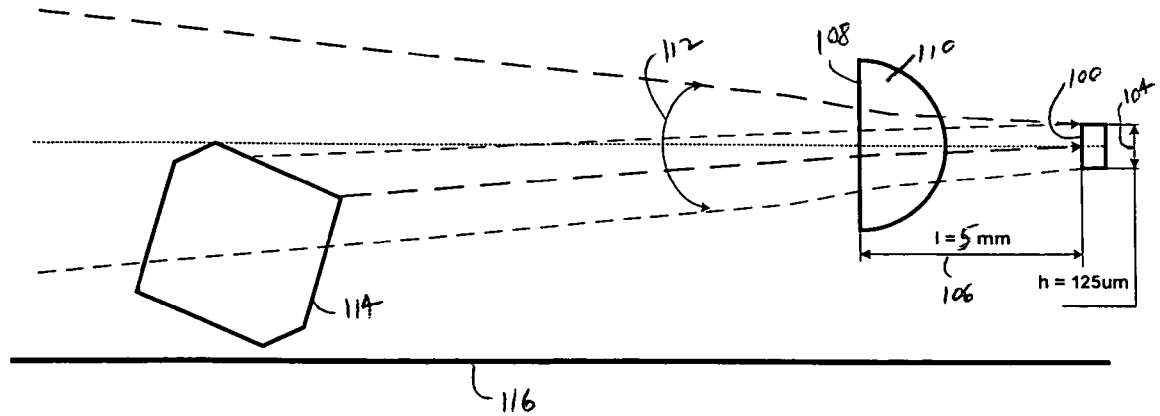
Figure 12:
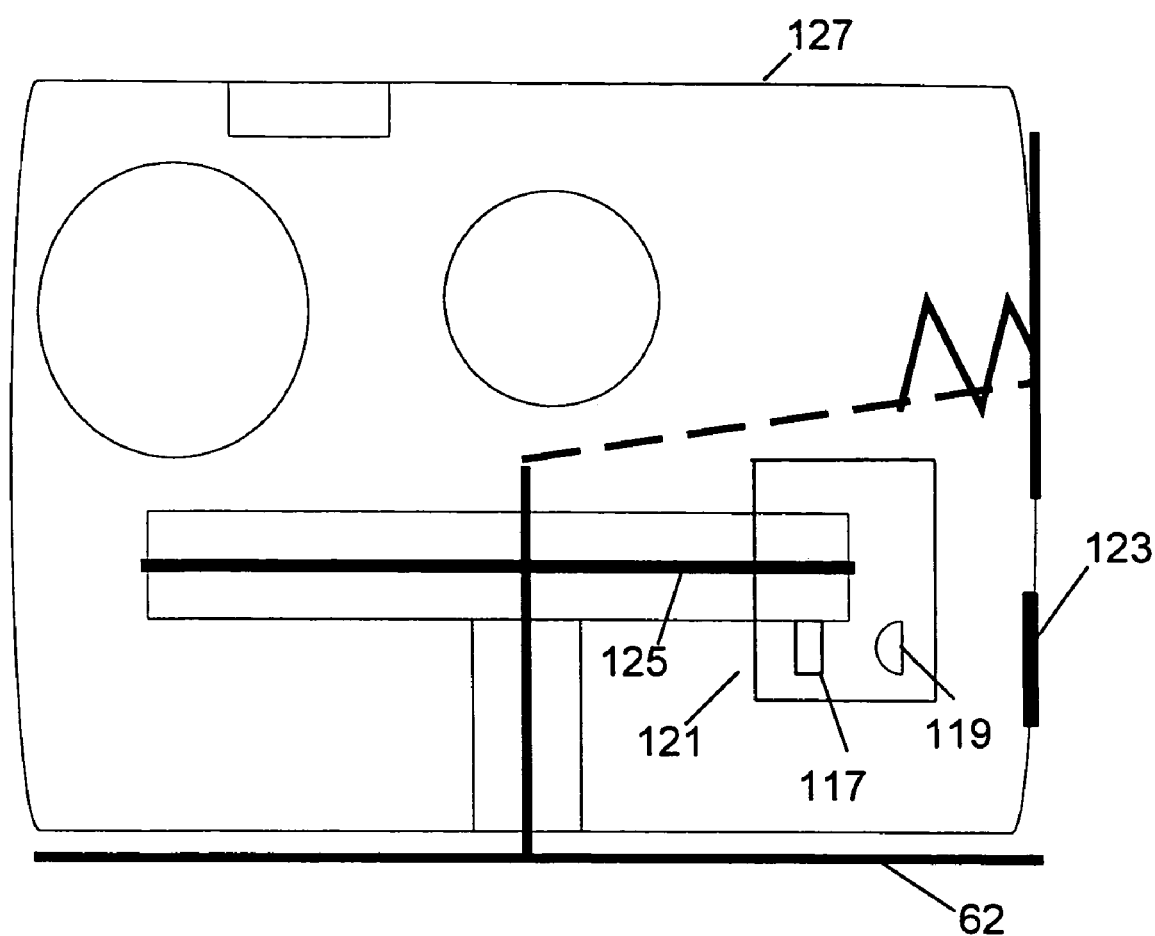
Figure 13:
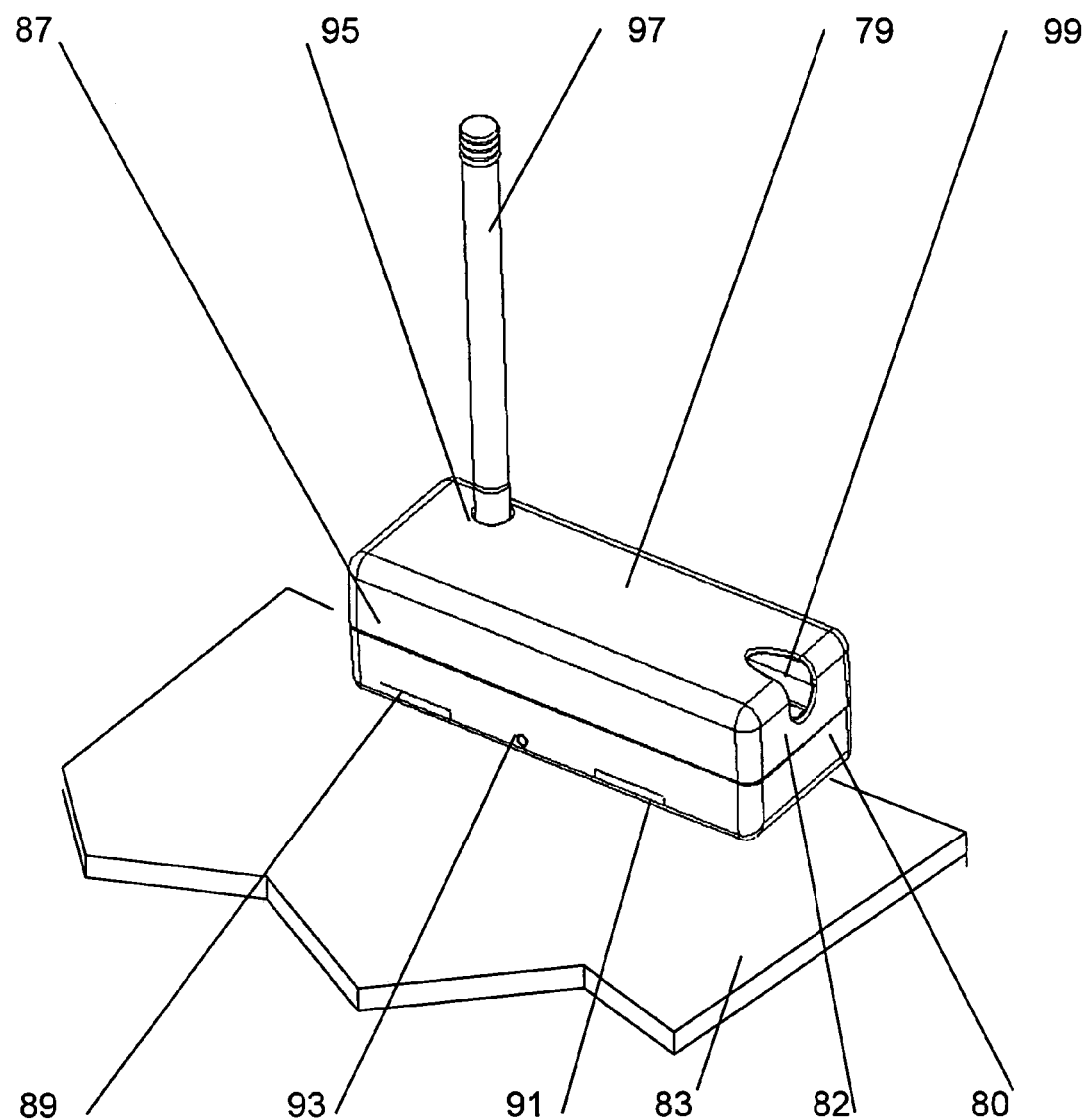
Figure 14:
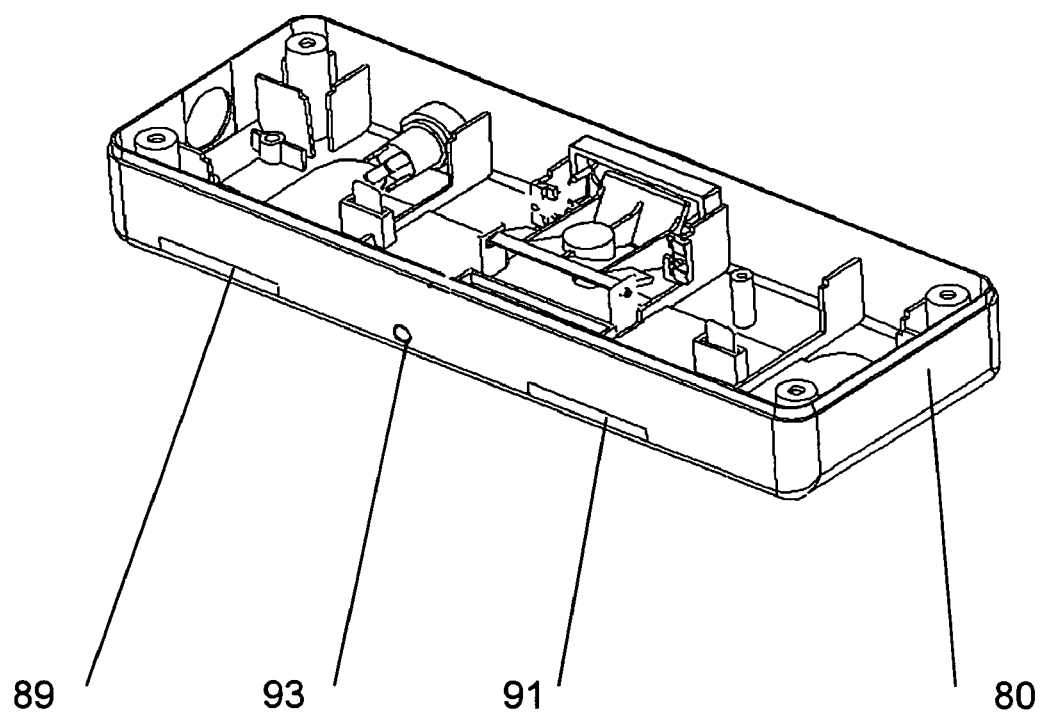
Figure 15:
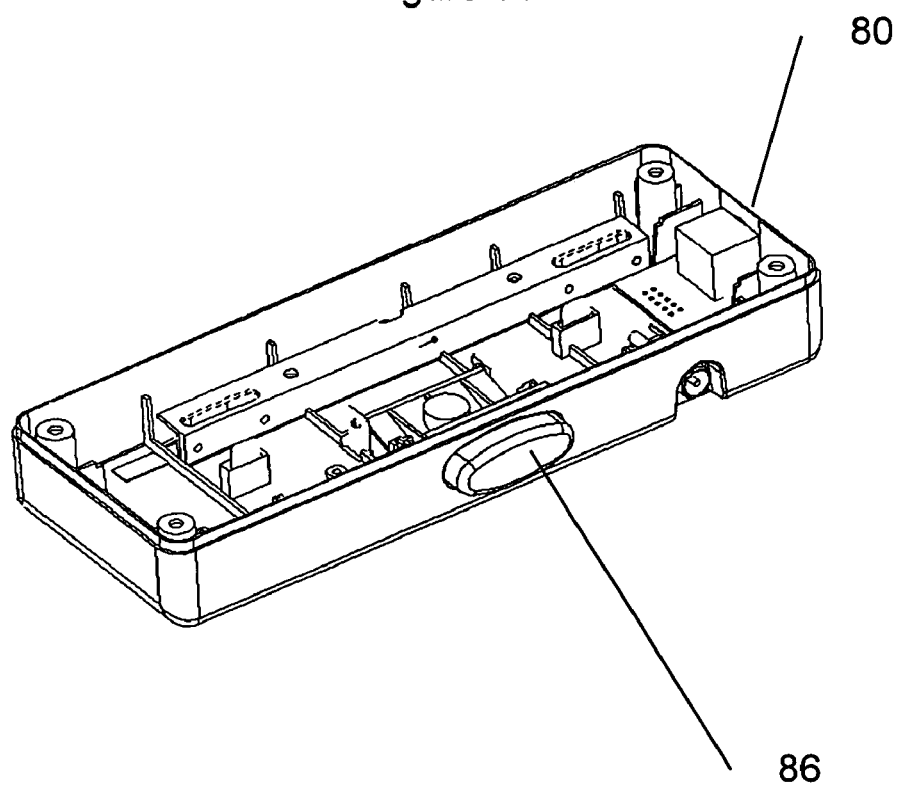
Figure 16:
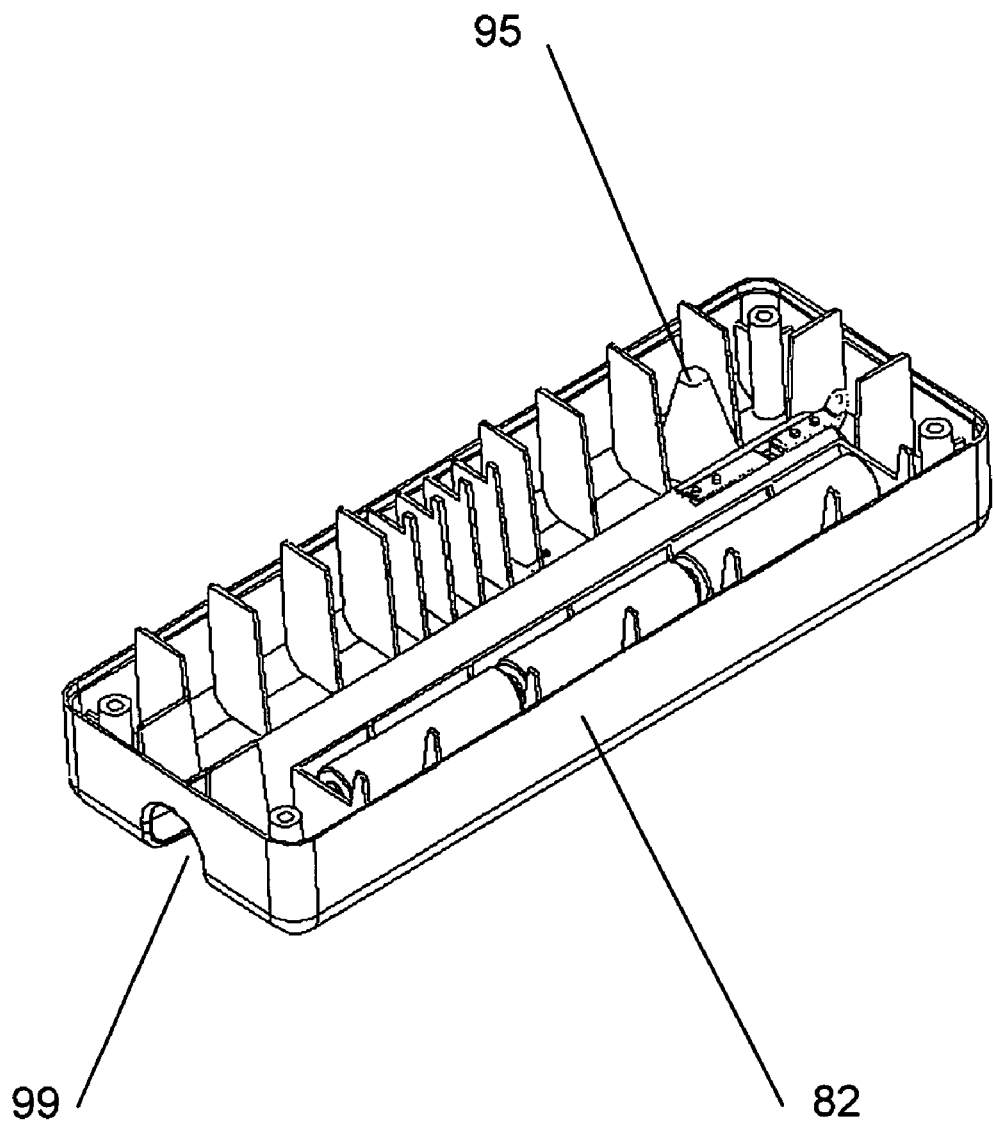
Figure 17:
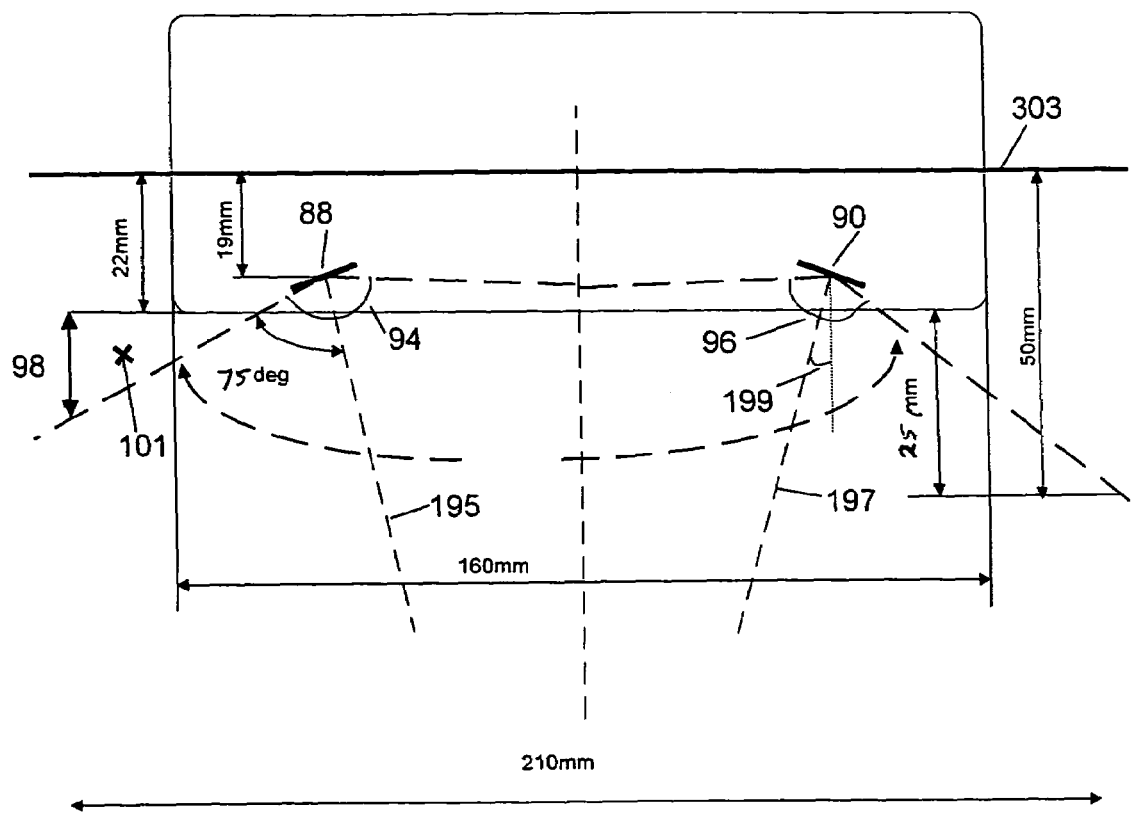
Figure 18:
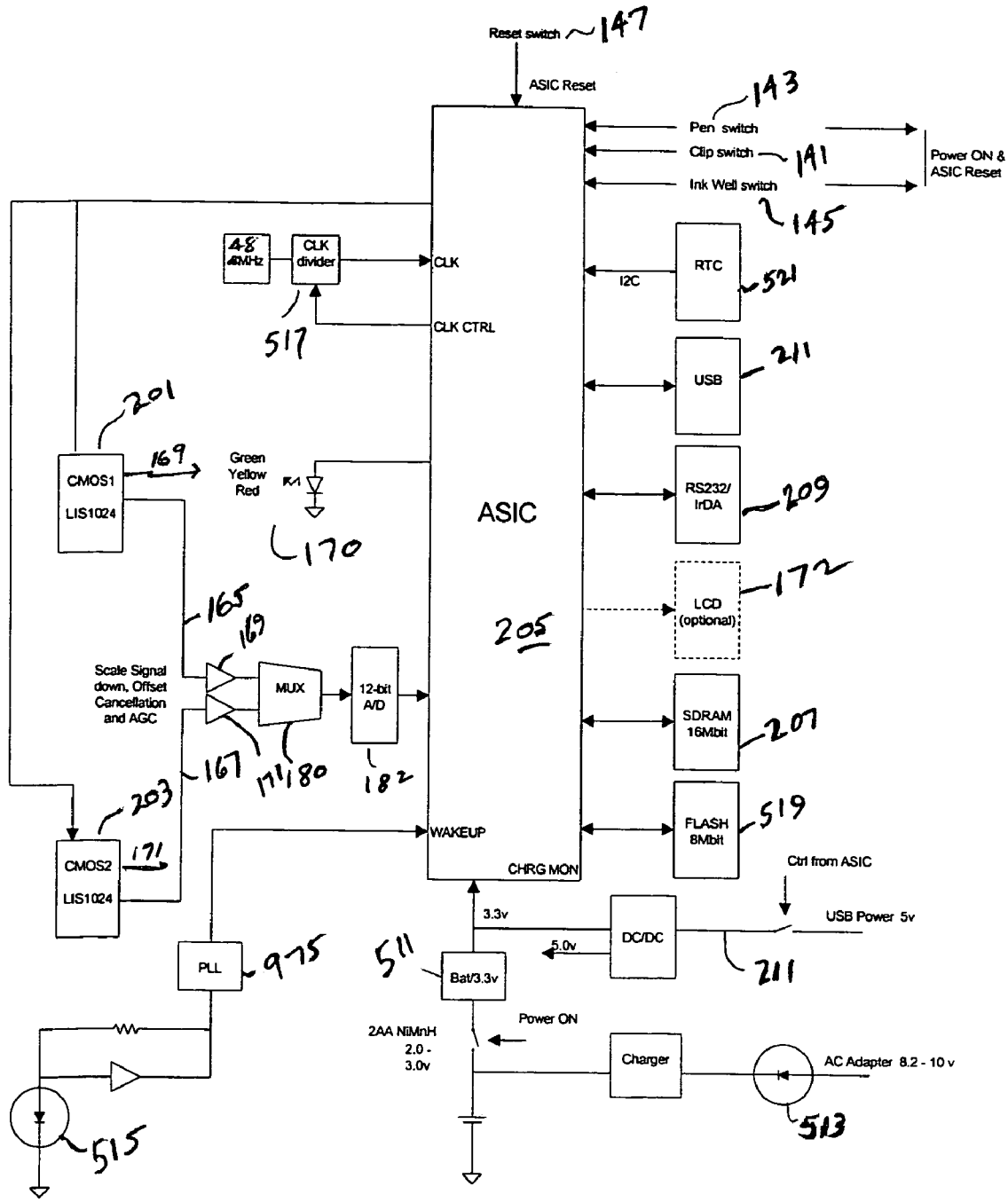
Figure 19:
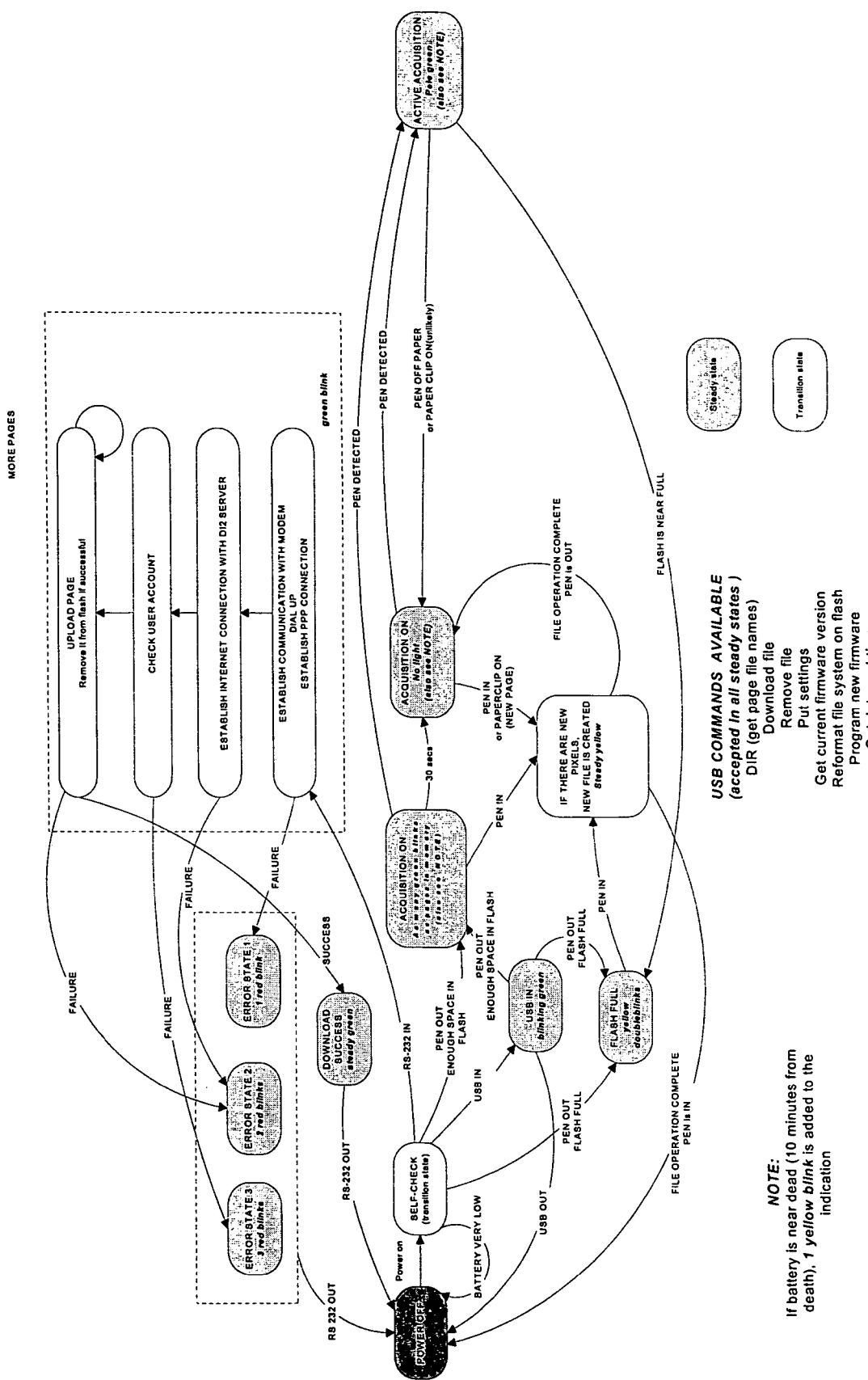
Figure 20:
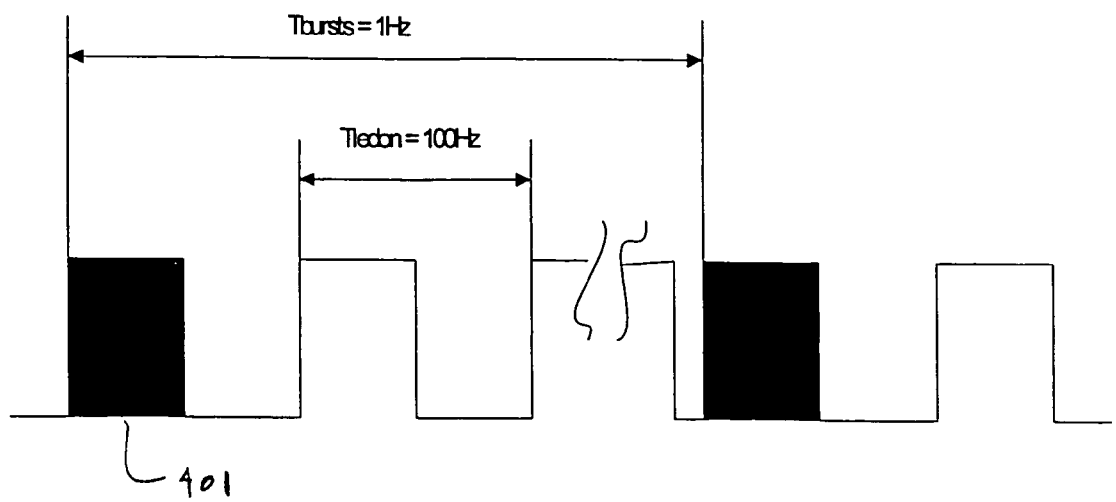
Figure 21:
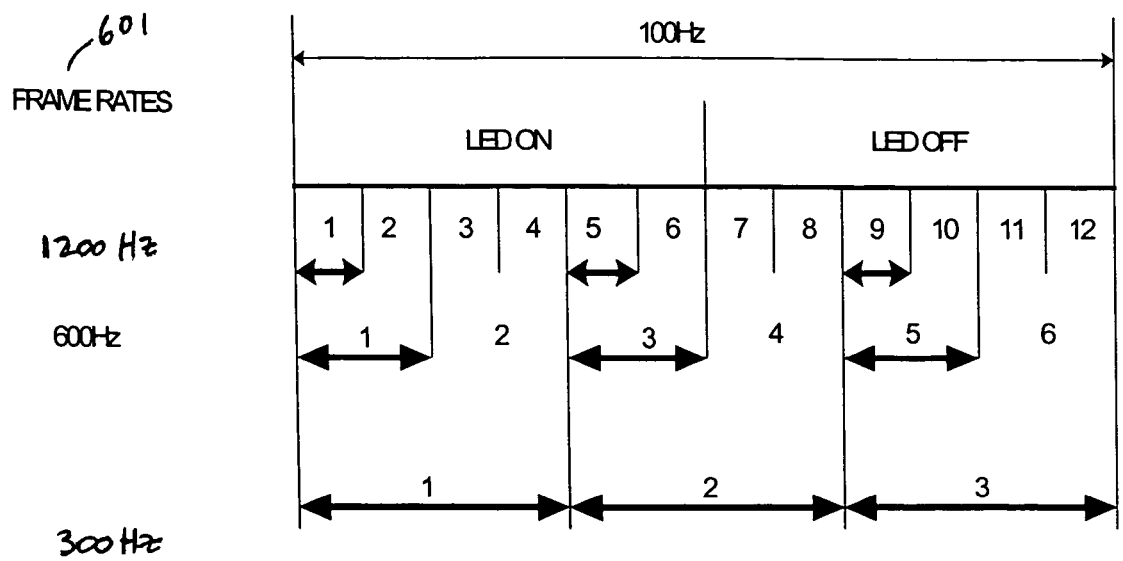
Figure 22:
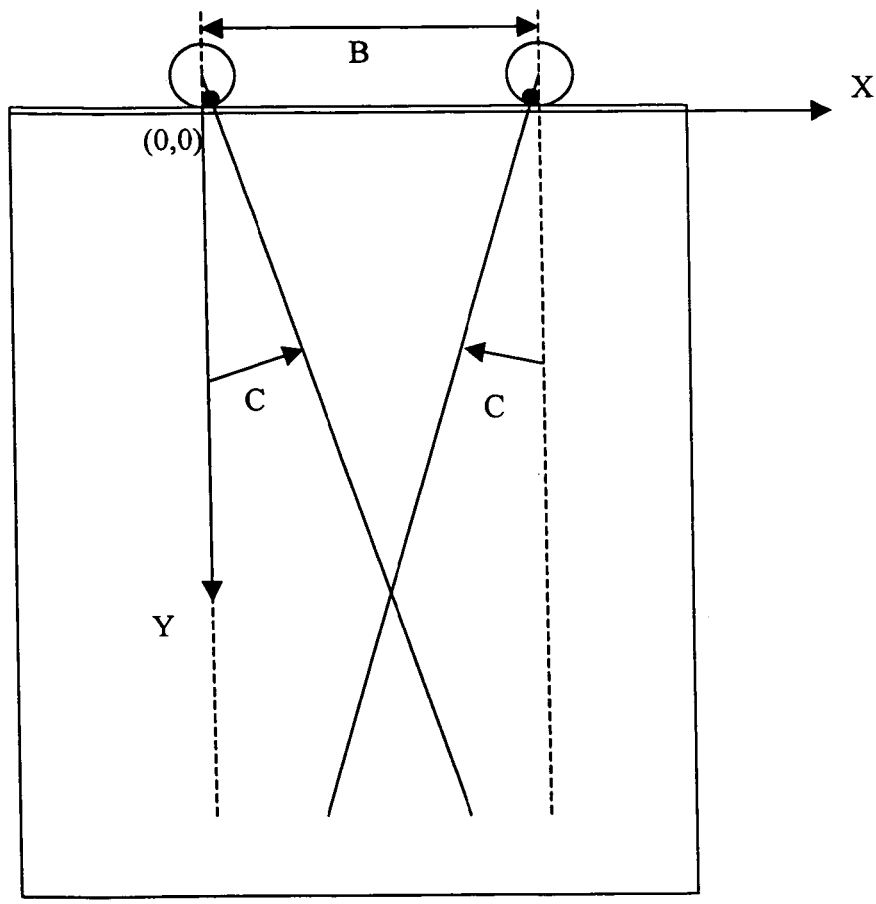
Figure 23:
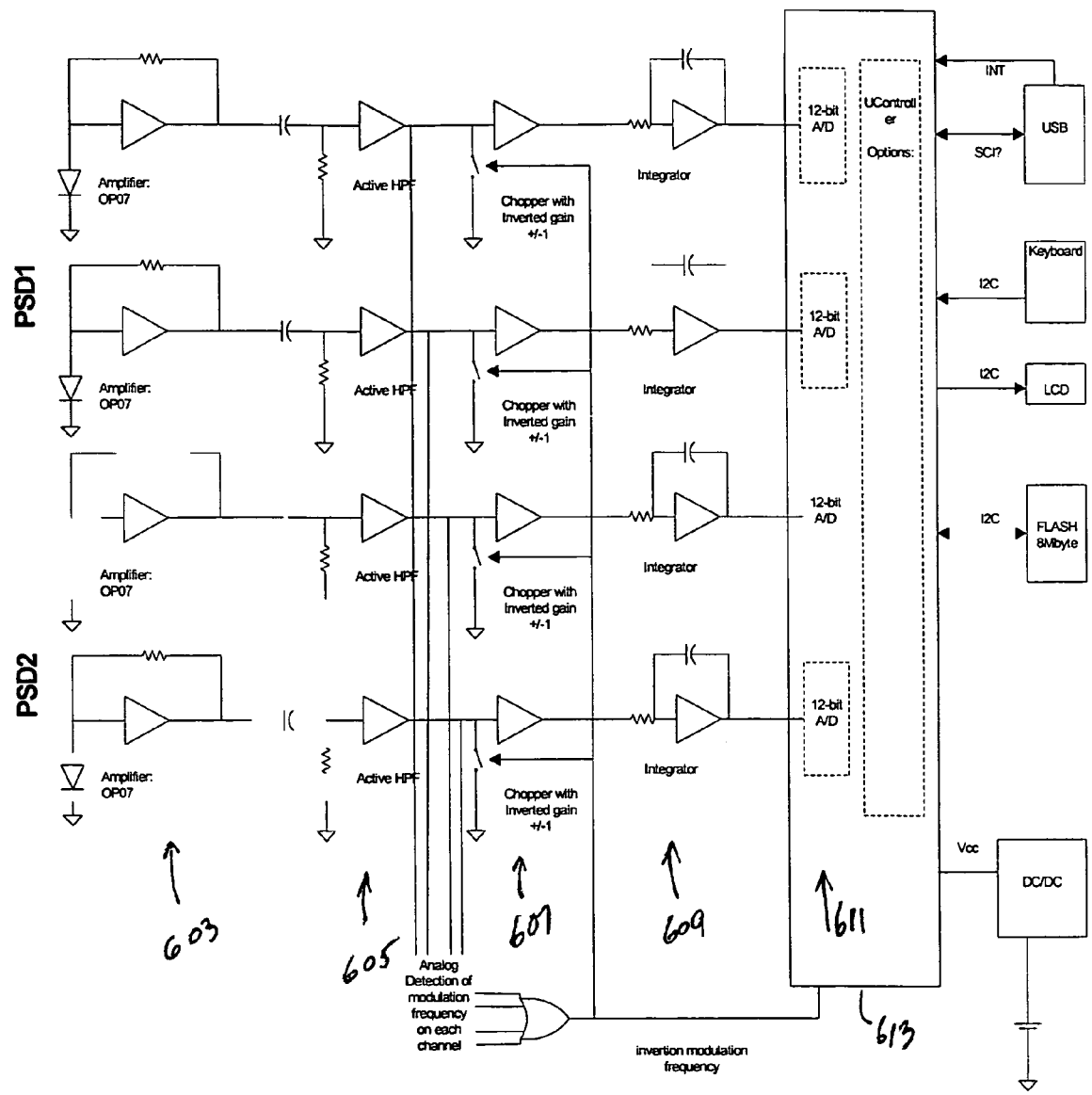
Figure 24:
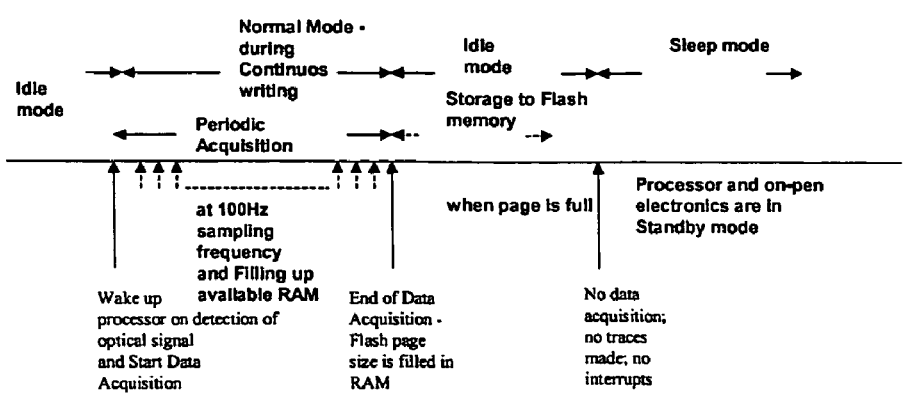
Figure 25:
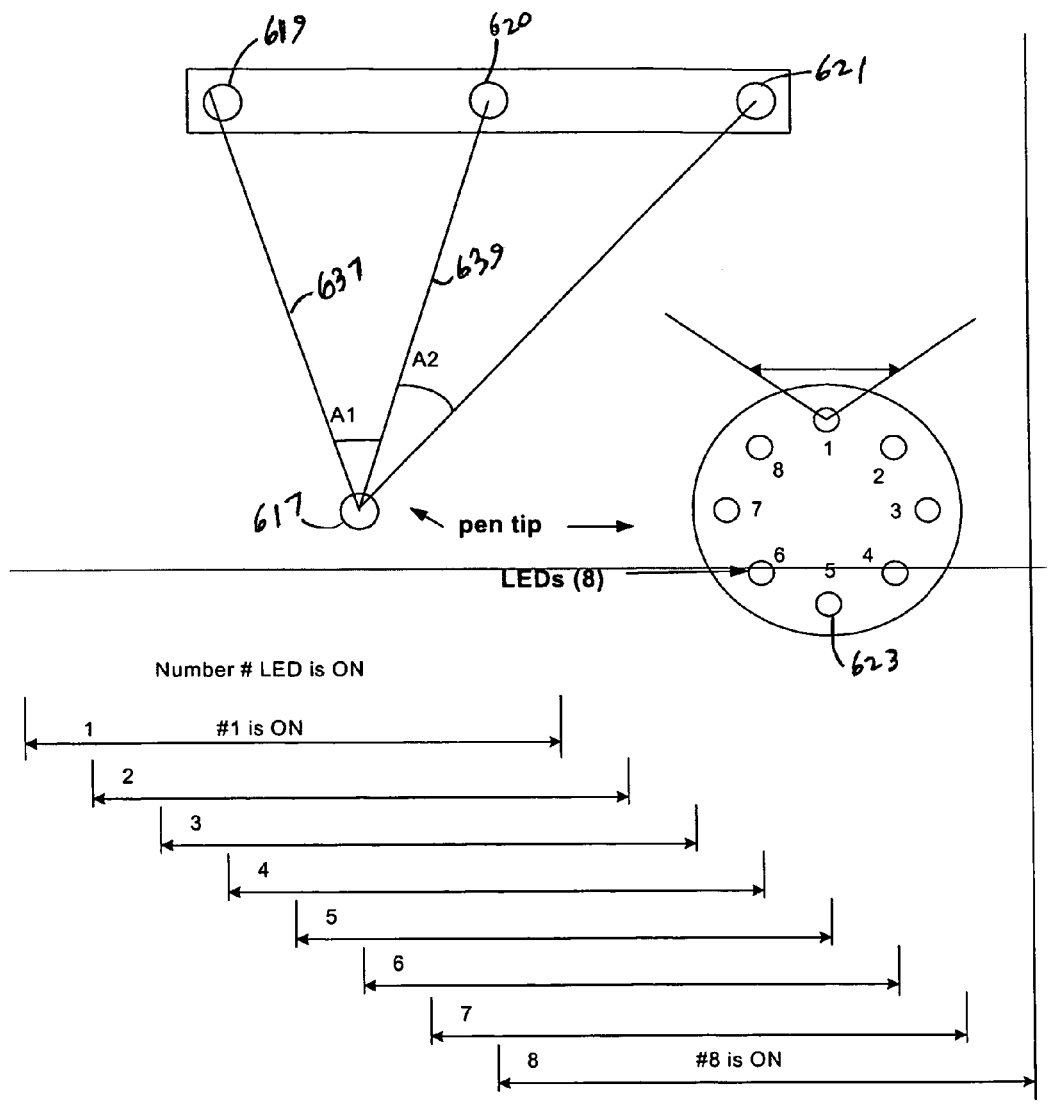
Figure 26:
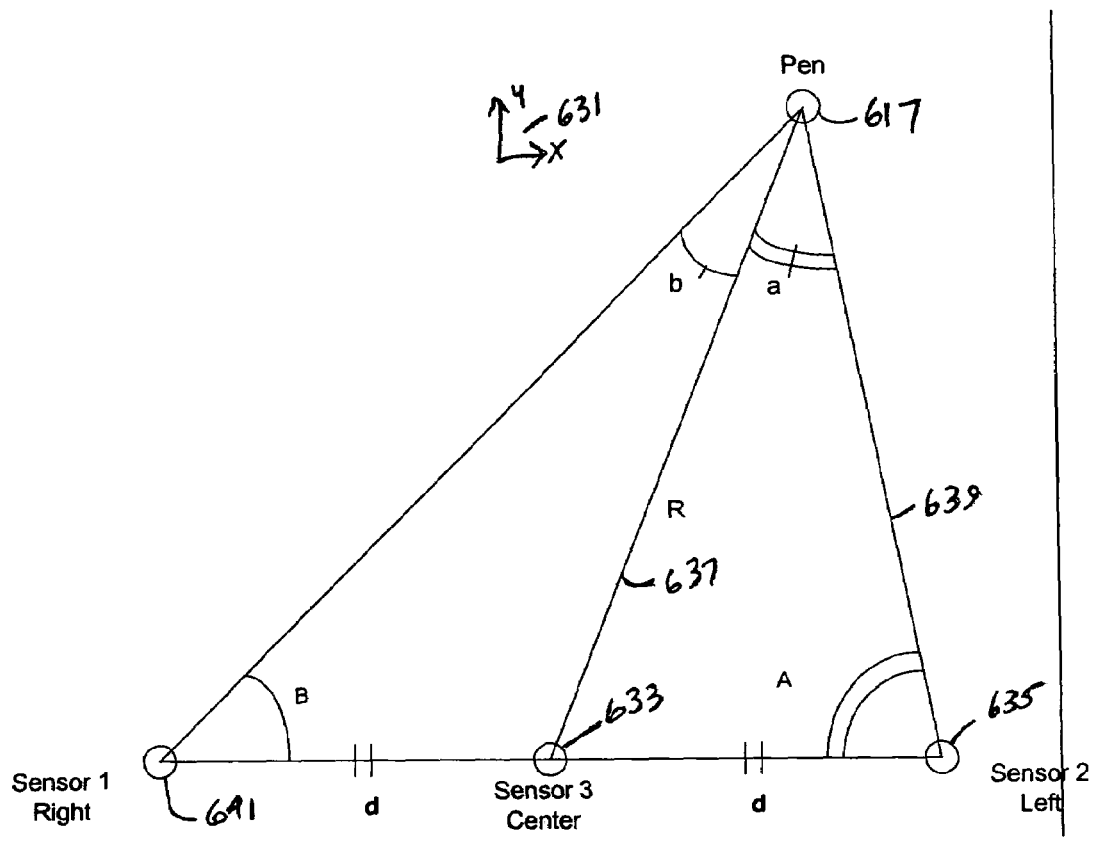
Figure 27:
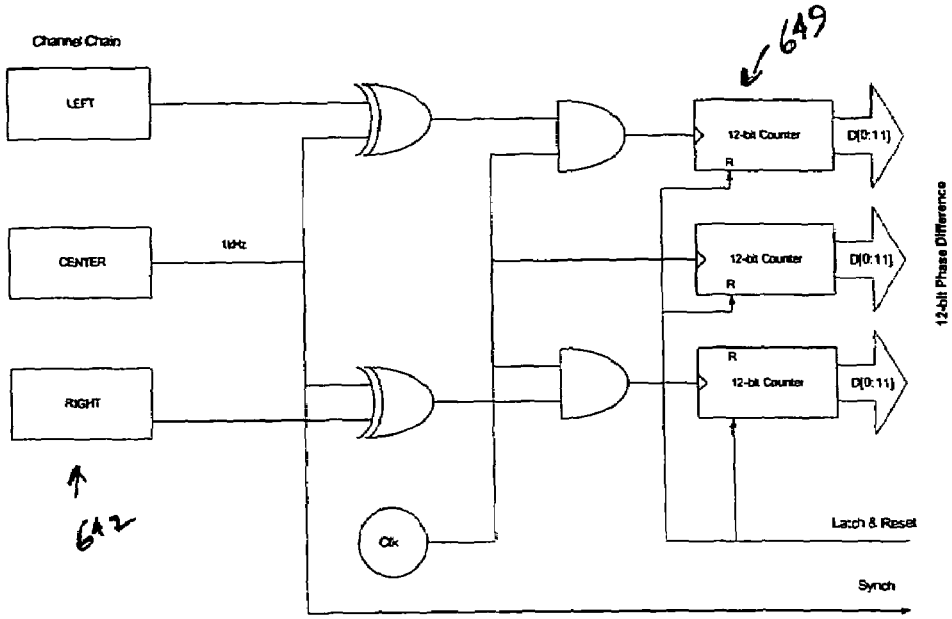
Figure 28:
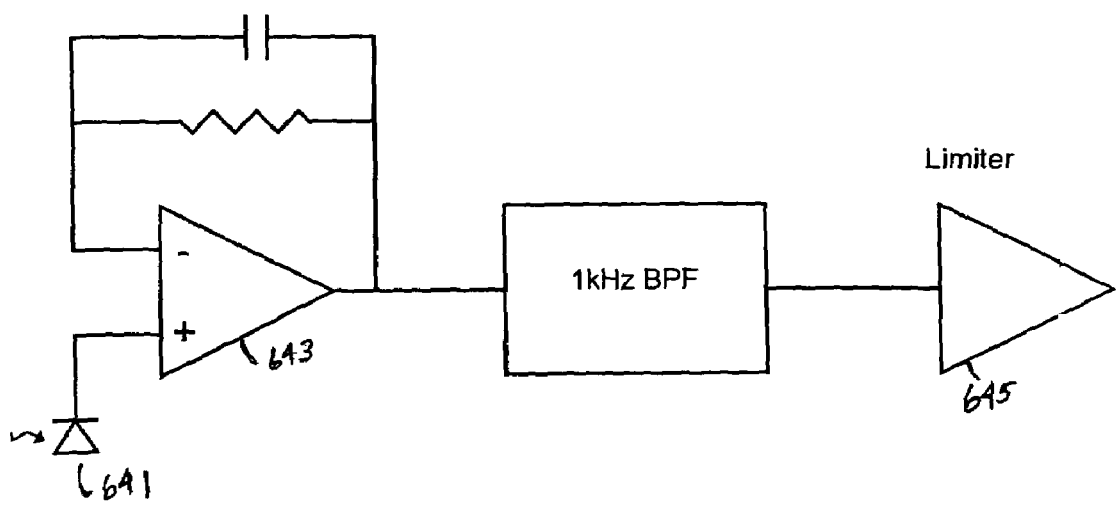
Figure 29:
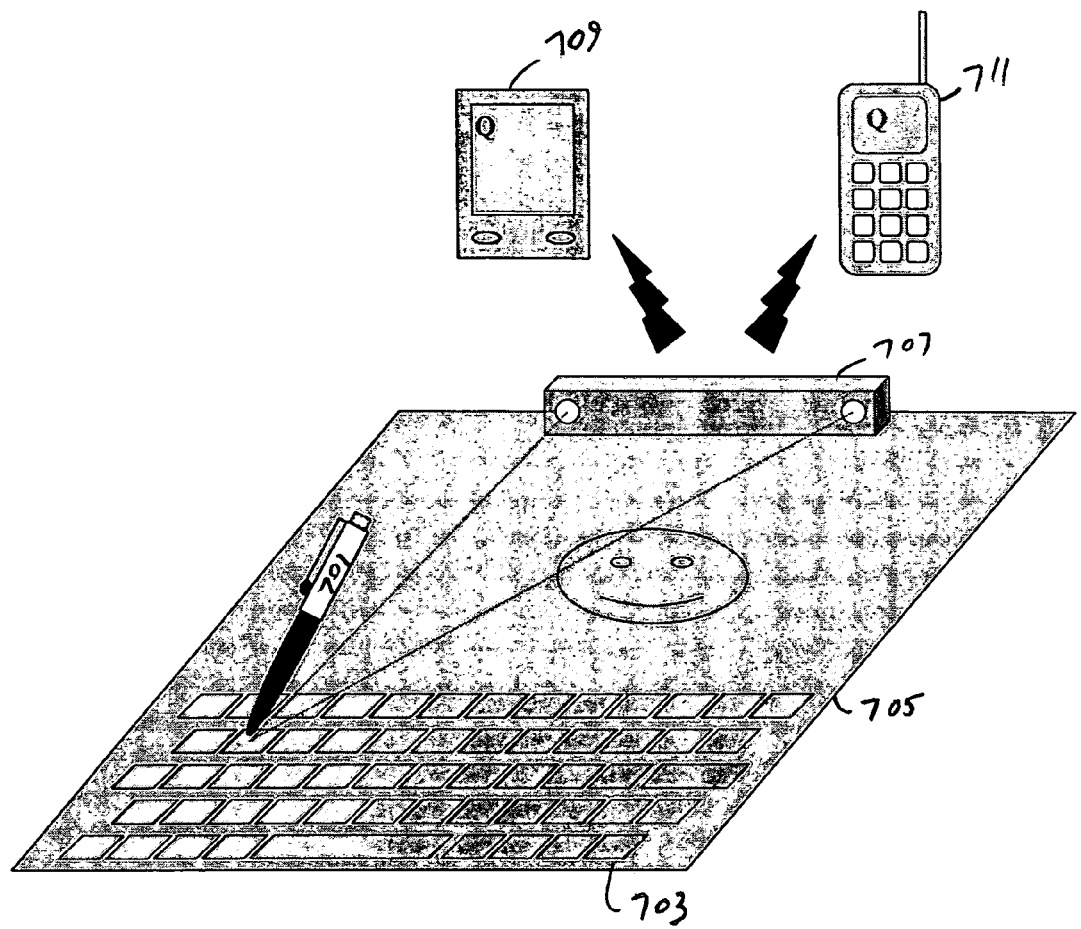
Figure 30:
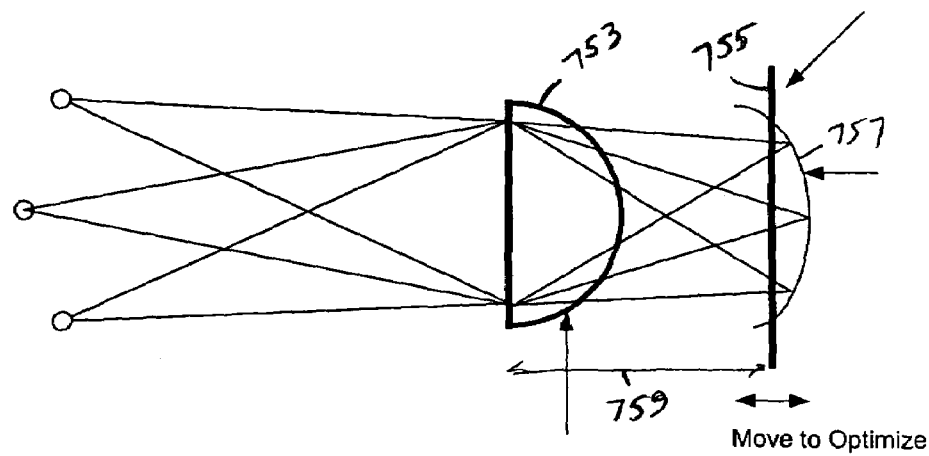
Figure 31:
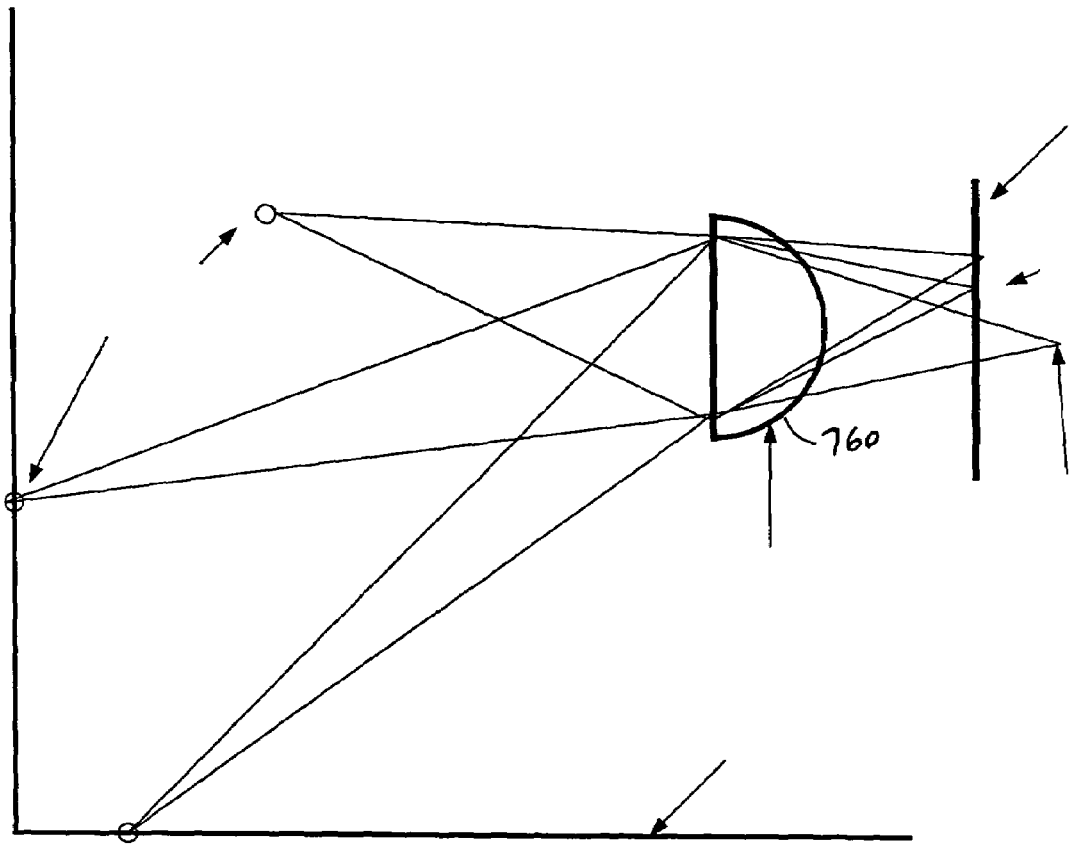
Figure 32:
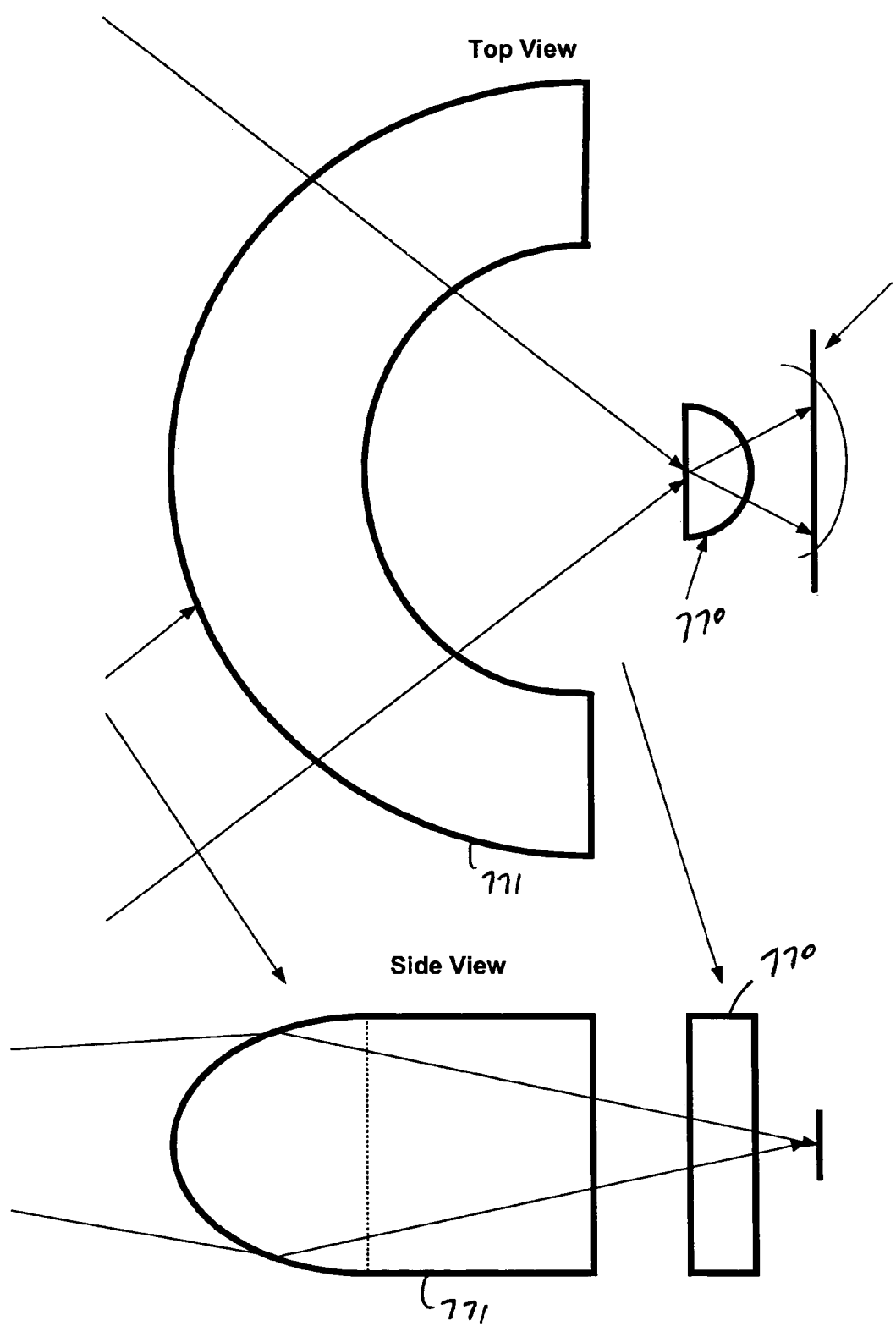
Figure 33:
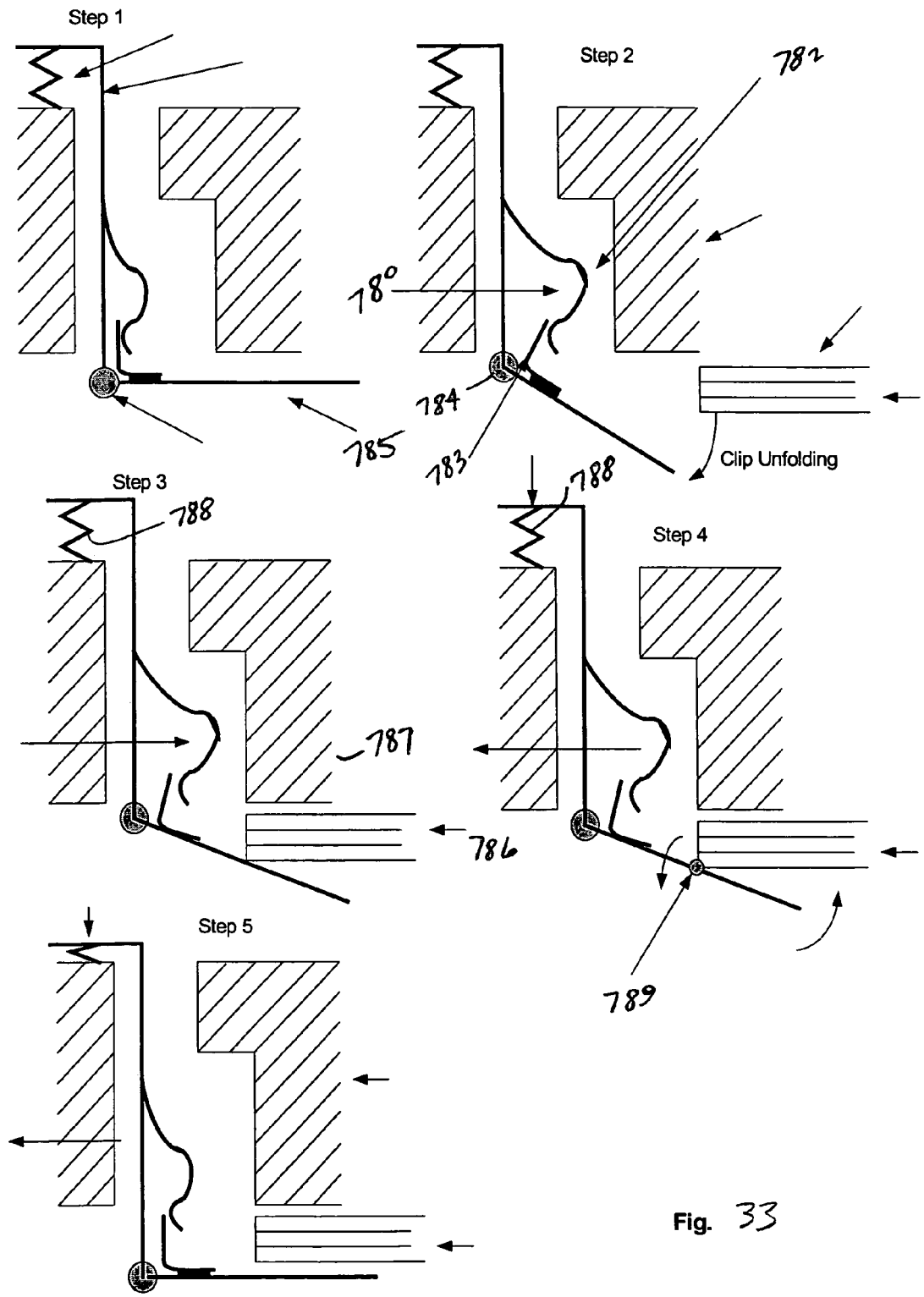
Figure 34:
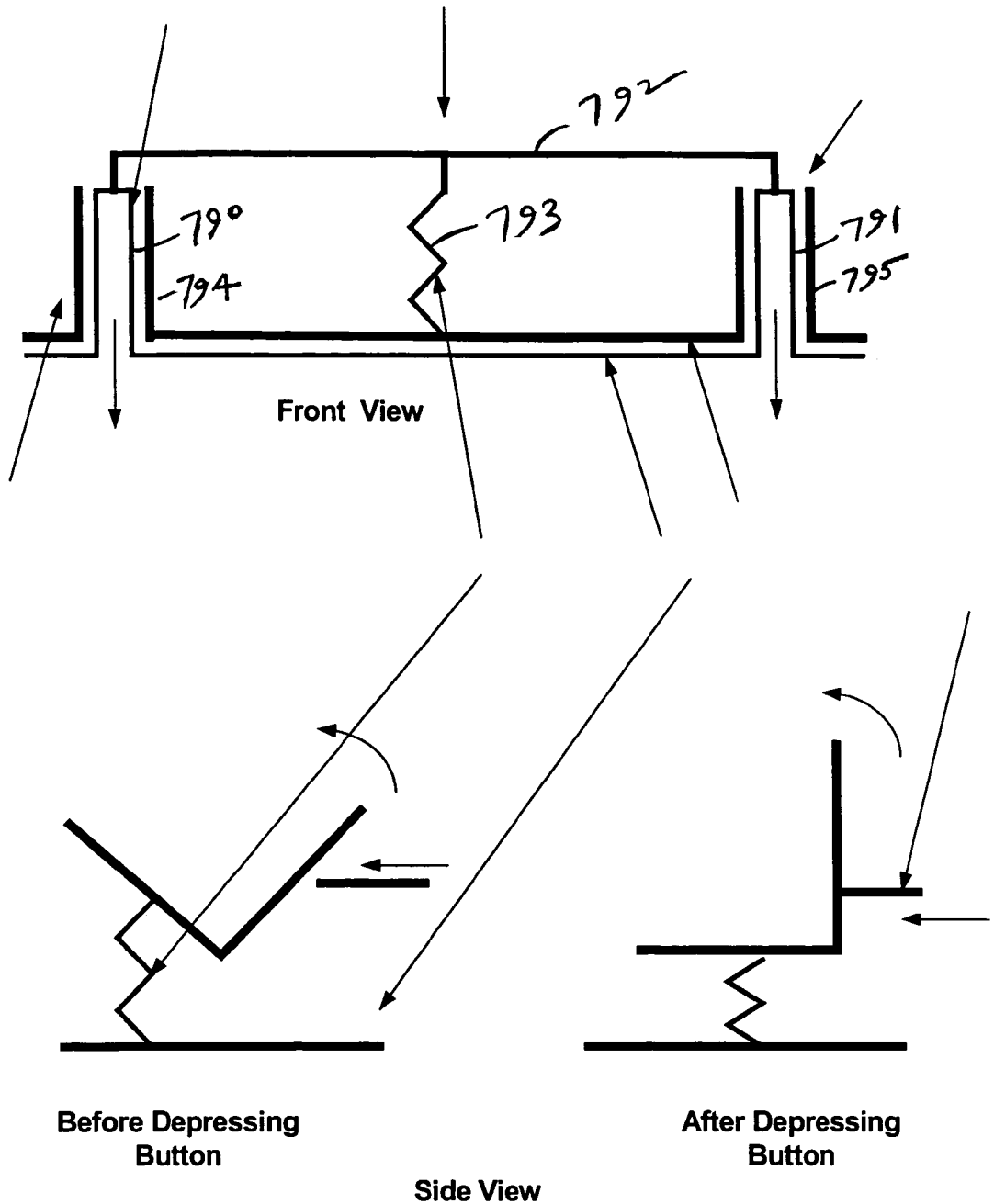
Figure 35:
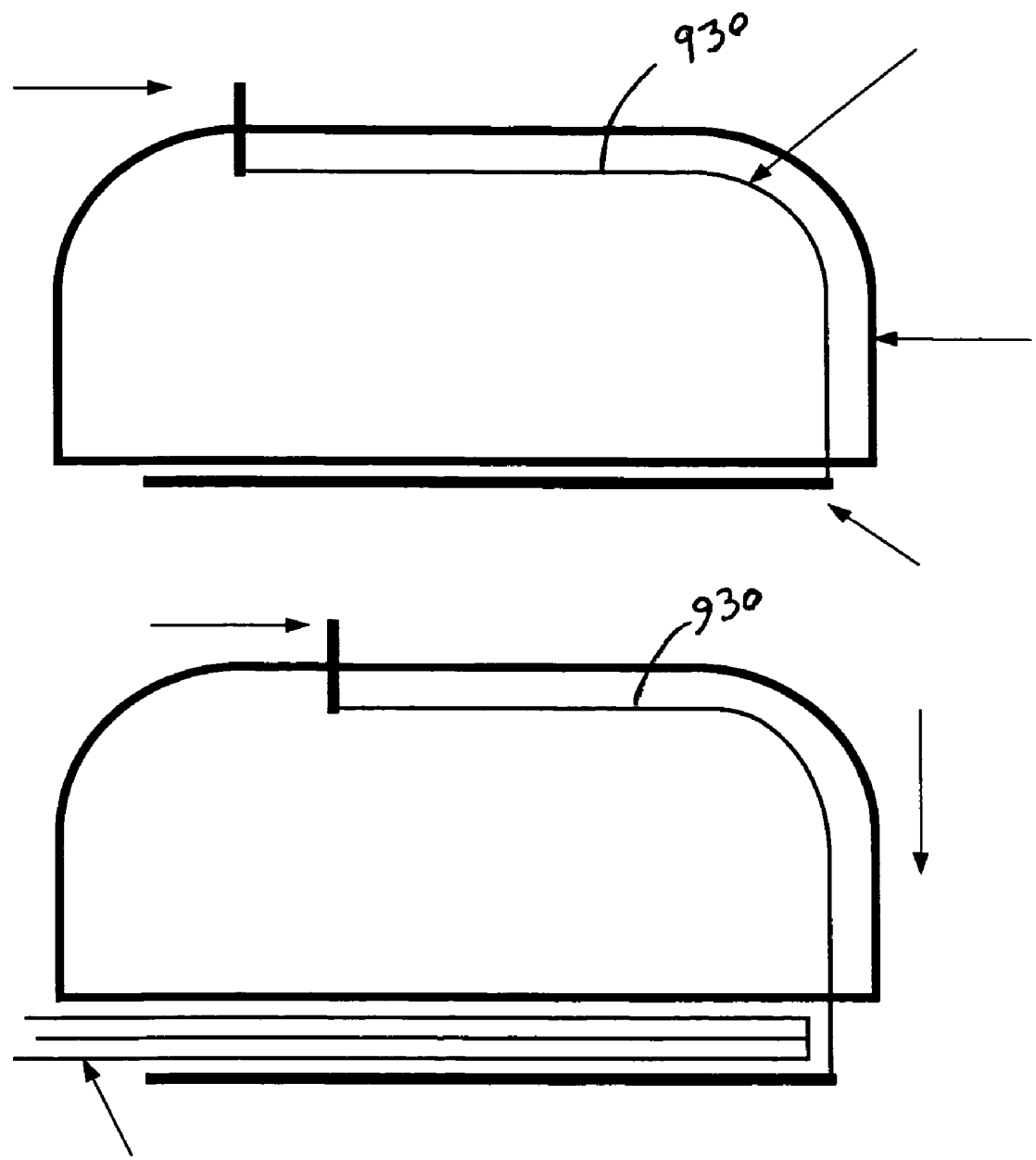
Figure 36:
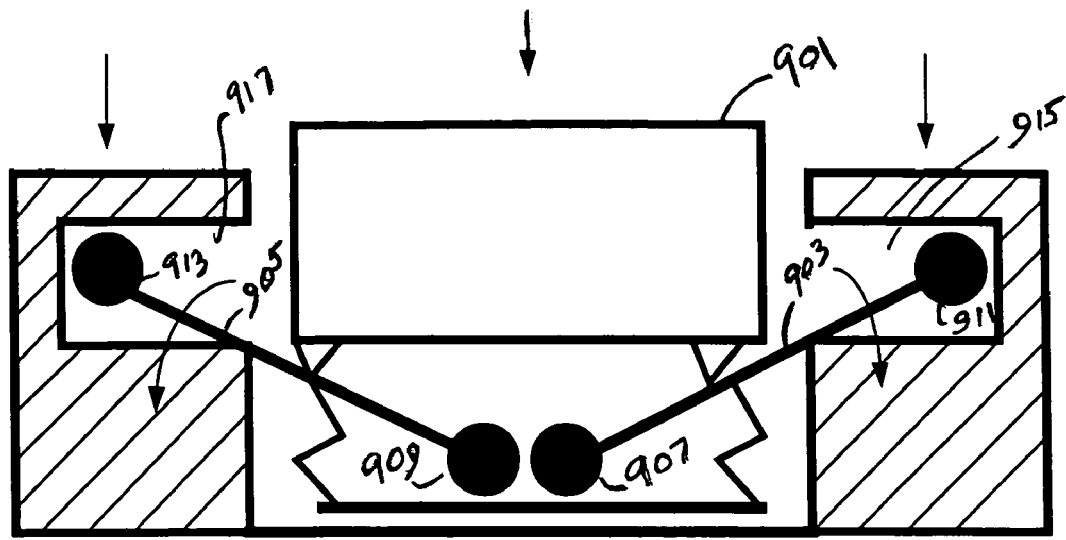
Figure 36:
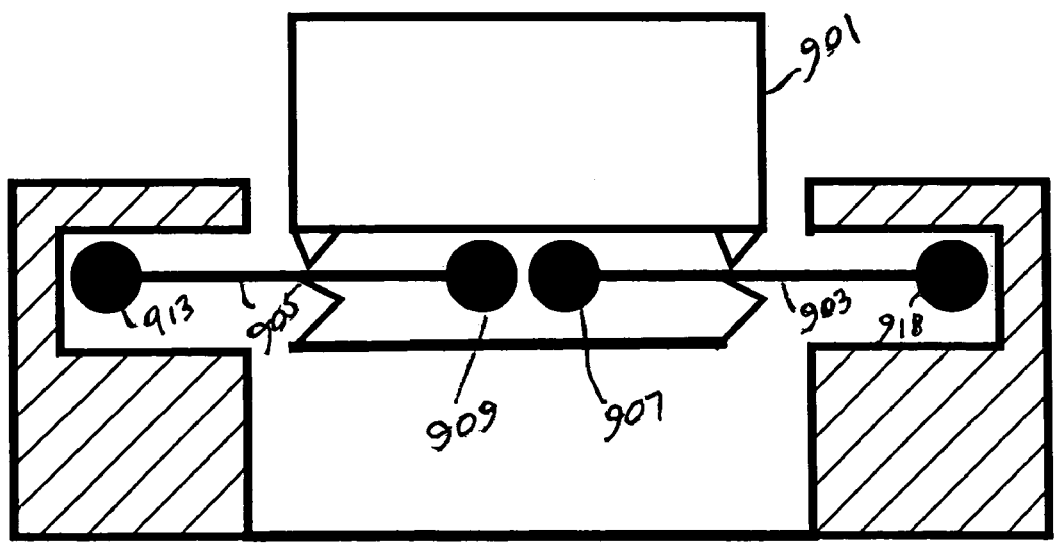
Figure 37:
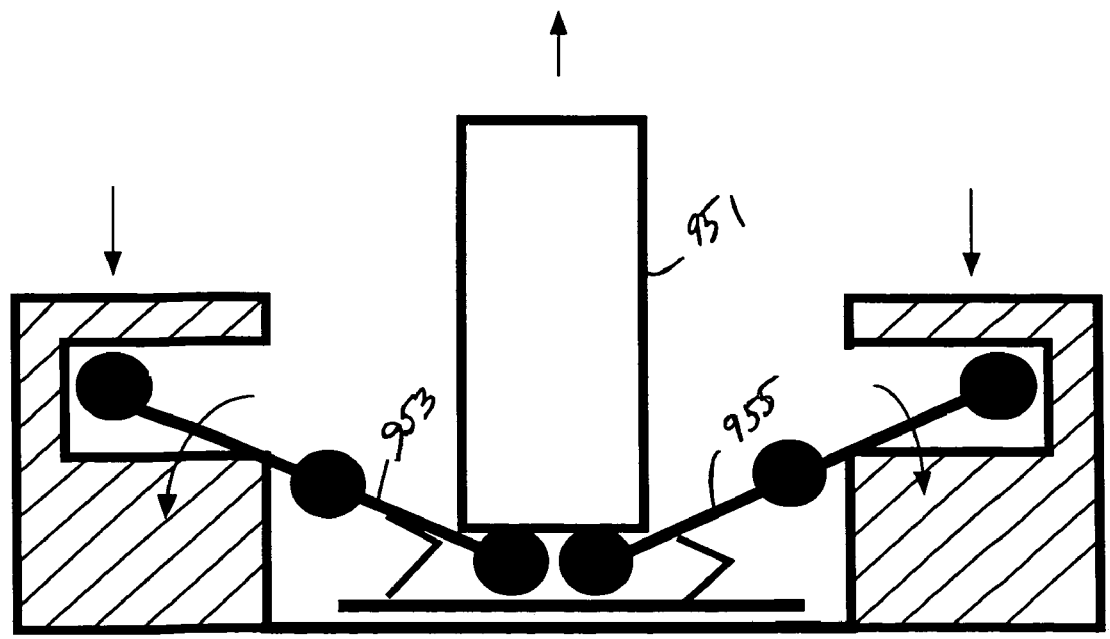
Figure 37:
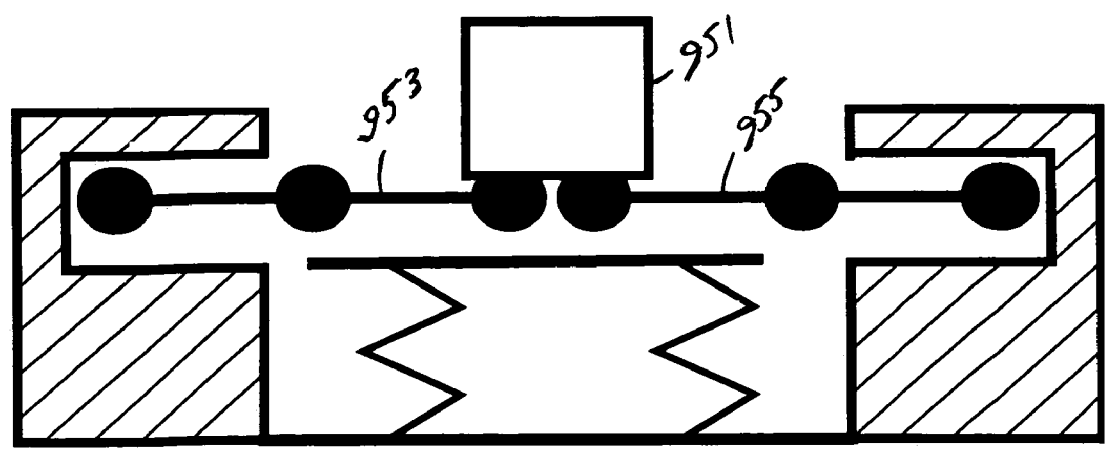

FIG. 1 shows pen tracking.
FIG. 2 shows a pen.
FIG. 3 shows a lens in a pen.
FIG. 4 shows a lens in a pen.
FIGS. 5 and 6 show reflection of light in a pen.
FIG. 7 shows a tracking method.
FIG. 8 shows a pen.
FIG. 9 shows a pen.
FIG. 10 shows a holder.
FIG. 11 shows a lens in front of a sensor.
FIG. 12 shows a holder.
FIG. 13 shows a holder.
FIGS. 14 and 15 show half of a holder.
FIG. 16 shows another half of the holder.
FIG. 17 shows a field of view.
FIG. 18 shows a block circuit diagram.
FIG. 19 shows a state diagram.
FIG. 20 shows a timing diagram.
FIG. 21 shows a timing diagram.
FIG. 22 shows geometry of tracking.
FIG. 23 shows a circuit diagram.
FIG. 24 shows a timing diagram.
FIGS. 25 and 26 shows a rotating beam technique.
FIG. 27 shows a channel diagram.
FIG. 28 shows a channel circuit.
FIG. 29 shows a paper keyboard.
FIG. 30 shows a spherical lens.
FIG. 31 shows an aspherical lens.
FIG. 32 shows a two-lens arrangement.
FIG. 33 shows a clip.
FIG. 34 shows a clip.
FIG. 35 shows a sliding belt clip.
FIG. 36 shows two views of a clip.
FIG. 37 shows two views of a clip.

We describe an electronic wireless pen that in addition to its regular function of leaving a visible trace on the writing surface also emits infrared (IR) light that is collected by external IR sensors to measure pen position with respect to the sensors. The sensors are CMOS or CCD linear or 2D arrays, Position Sensitive Detectors (PSD) or other light sensitive detectors. The sensors can be clipped to the edge of writing surface allowing reconstruction of writing on that page. The position of the pen is determined by mapping the sensor reading to the actual XY position of the pen on paper.

This electronic input device looks like a regular pen with a holder. The user writes with it just as with any ordinary pen on paper, notebook or any other flat surface. It is used to capture handwriting text or drawings. The pen stores all its movements during its use by recording sensor measurements into its memory. The pen then downloads it to a computer, personal digital assistant, handheld computer or cellular phone. The handwriting, as it appears on a page, is then automatically reconstructed from sensor information.

As shown in FIG. 1, a pen or other writing instrument 10 that leaves a visible trace 12 of writing or drawing in the usual way on a sheet of paper or other writing surface 14 may also have a source 16 that emits infrared (IR) light 18 for use in automatically tracking the motion of the pen. The light is detected by IR sensors 20, 22 that are held stationary relative to the pen at a nearby location, for example, near the edge 23 of the paper.

The sensors deliver sequences of signals that represent the position of the pen on the writing surface (e.g., angle 24) at which the light is received from the pen for each of a succession of measurement times. Circuitry associated with the sensors uses an algorithm to process the directional information (and the known distance 26 between the sensors) to determine a succession of positions of the pen as it is moved across the writing surface. The algorithm can use a mathematical model that translates pixel signals of the sensors into positions on the writing surface. The algorithm could be a quasi-triangulation algorithm using calibrated parameters (distance from lens to sensor and horizontal offset between their centers of refractive index) or it could be a polynomial approximation.

The tracked motion of the pen can be used to recognize handwriting or capture drawings created using the pen or used in a wide variety of other applications. The tracked motion information can be sent to a local personal computer or to a central computer through a personal digital assistant, a handheld computer, or a cellular phone for central storage and processing.

Tracking of Light Source with a Two or One Dimensional Sensor

The problem of tracking XY bearing of a pen can be formalized as follows.

The pen carries a finite source of light close to the tip. This source emits light which intensity in the test point depends on the XYZ position of a test point with the source in the origin.

A multichannel detector is located at another location. It collects some portion of the light emitted by the source on a pen. Intensity delivered to different channels varies depending on the XYZ position of channel inputs with respect to the location of this source. Intensity data are sufficient to calculate the XYZ position of a source relative to the detector. Intensity data are also subject to noise including source instability, detector noise, and other kinds.

We are interested in obtaining the XY bearing of the pen only. In fact, all three coordinates will vary due to thickness irregularities on a writing surface and due to varying tilt of a pen during writing. Along with noise this will cause complex variations in channels reading.

There are different ways of processing such signals: weighted average (center of gravity), median computation, thresholding, etc. They mostly address noise cancellation and treat Z motion of a source as noise also.

Our goal is to establish such a property of the detected signal that would be invariant to the motion of a pen in Z direction and to some sources of noise.

For this purpose, we introduce an aperture between a detector and the source. This aperture may contain a lens, for example. Thus we obtain a spatially limited signal. This means that there is a closed group of detector channels that is excited by both the signal and the noise (a segment in case of a linear array detector). This group is surrounded by channels that are excited by the noise only. In the absence of an aperture, all channels are excited by both the signal and the noise.

After creating such a signal we establish a specific point (e.g. maximum) and define a processing window around this point in such a way that it extends beyond a spatially limited signal. Then a cumulative distribution function of data inside the processing window is calculated versus channel numbers. The projection of this function's half magnitude point on channel numbers produces the invariant property. While channel numbers are integers, the invariant property value may be fractional.

There are basically two types of detectors, whether 2D or 1D. Each detector can be a two channel detector, like a PSD, or a "multichannel" detector like a CMOS and CCD device. PSD detectors have two output signals whose ratio defines a relative position of incident light spot. CMOS and CCD detectors have a number of pixels. Each pixel defines a particular space on the detector and has an analog output. These analog outputs can be digitized for later processing in firmware or software, or can be processed by analog means. Algorithms used in software can alternatively be implemented in hardware in the same way.

One Calibration Procedure

There is no need to achieve a linear response of the detectors to pen motion as has been proposed in other known approaches. A linear response would be required if simple triangulation were to be used to interpret a detector reading as an XY position of a pen.

An unambiguous dependency exists between the XY position of a pen and left and right detector (L and R) readings as follows:

$$X=Fx(L,R);$$

$$Y=Fy(L,R). \qquad (1)$$

These functions can be expressed as polynomial series. Coefficients in these polynomials can be determined during the calibration procedure.

During the calibration procedure, the pen is positioned in different known XY locations on the paper and readings of both detectors are taken and stored for future processing. After a sufficient number of points has been accumulated, common linear algebra methods are used to calculate the coefficients in (1).

We know that system (1) is substantially non linear. It is important to locate calibration points in such a way that a necessary resolution is achieved across the entire writing area. We do not locate the calibration points in the nodes of a regular rectangular grid. Instead, we use mathematical models to match a calibration grid to particular nonlinear properties of our detectors.

Another Calibration Procedure

If simple triangulation is used to calculate an XY pen position from detector data, we intentionally introduce an error into the geometrical parameters of our detectors to allow for the nonlinear properties discussed above.

We know exactly the refractive index of the lenses in our detectors and distances between the lenses and sensors by virtue of our design. At the same time it has been proved that varying these values in triangulation computation one can effectively compensate the nonlinear properties of detectors.

To obtain effective values for refractive index and distances between the lenses and sensors we run another calibration procedure. The different XY location calibration points are necessary for proper resolution across the writing area. Locations of calibration points for this disturbed triangulation are obtained through mathematical models.

The Pen

As shown in FIG. 2, in one example, the IR source in the pen can be an LED 13 that emits IR light 15 at the tip 17 of the pen when pressure is applied during writing. In this example, the LED source 13 is formed by a ring of LEDs 19 arranged around the longitudinal axis 21 of the pen (only two LEDs are shown).

Light from the LEDs is project downward toward the pen point and into a body/lens of acrylic material 18 that operates as a light pipe. The acrylic lens diffuses and transmits the received light so that light emitted from the pen is delivered along optical paths in all directions around the pen.

As shown in FIG. 3, the pipe 18 is polished and reflective and concentrates light 502 from the LEDs 19 inside by not allowing the light to escape sideways. The bottom part of the pipe is also polished at the 45 degree conical surface 504 at the bottom of the pipe. A reflective cylindrical shell 506 helps to confine and cause mixing of the light that is emitted from the LEDs. A conical body 508 supports the light pipe.

Downwardly directed light within the pipe is reflected from the conical surface 504 and delivered to the air at all angles around the pen.

FIGS. 5 and 6 illustrate side and top views of internal reflection of light in the light pipe. Most light from the LEDs passes along the length of the body of the pen and is reflected at a 90 degree angle toward the sensors. Some other light finds its way out of the pen at angles different from 90 degrees.

As shown in FIG. 2, the light that is emitted from the pen is confined to a vertical space 11 that is near to the writing surface 13 so that as much of the light as possible can reach the sensors (not shown), which are also positioned within a small distance of the writing surface.

Other configurations having different shape light pipes/lenses could be used, including the one shown in FIG. 4, which may have a better coupling between the LED and the light pipe and more effective splitting and directing of light toward the reflective surface at the bottom of the pipe.

The pen in this example (FIG. 2) includes a ball-point pen cartridge 23 that terminates in a writing point 25. When the user bears down on the writing point during writing, a pressure switch 26 delivers a signal that can be used to turn on the LEDs and to trigger functions of circuitry 28 also mounted in the pen. Circuitry 28 and LEDs 19 are powered by a battery 30. The components are all held in a housing 15.

As shown in FIG. 7, the pen position in an x-y coordinate system 40 parallel to the writing surface is determined from two angles alpha and beta that are sensed by the two sensors 20, 22, and the known distance 26 between sensors.

In another example, shown in FIG. 8, the pen is powered by three miniature AAA-like NiCd rechargeable batteries 51 that are held in the back of the pen (For better weight distribution the batteries will be moved closer to the tip, with the circuitry placed at the back). The batteries power the electronic circuitry 28 directly without any DC-to-DC converter. The power is delivered only when the pressure switch 26 is activated. The light activation switch travels only a short distance (e.g., 0.25 mm). The switch is preloaded by a spring mechanism to minimize refill travel, which should not exceed 0.008–0.010 inches.

Pressure sensors would be an way to effectively match pressure on the pen refill with activation of LED, as many off-the-shelf switches have an activation pressure above the desired level of 20 to 30 g.

The electronic board 28 positioned behind the battery generates modulation frequency pulses at approximately 100 Hz and a 50% duty cycle for the IR LEDs along with the bursts of 1 to 10 kHz to generate pen on and pen off signals for sleep mode.

The light emitted from the pen is visible in all directions to enable the pen to be used in any orientation in the hand. The closer the emitted light is to the tip of the pen, the less is the error due to the variations of pen angel to paper, and the more accurate is the tracking of the tip of the pen. The LED light should be in an IR region away from the visible light spectrum so that ambient light from the sun and light fixtures does not interfere excessively with the IR emission and is not visible to the human eye.

The IR source at the pen and the orientations of the sensors in the holder are arranged to assure that as the pen tilts and rotates during normal writing or drawing, its IR beam reaches the sensors.

FIG. 9 shows a more detailed isometric view of a partially assembled pen.

Pen Holder

As shown in FIGS. 1 and 10, the sensors can be housed in a typical pen cap 70 in which the pen can be held when not in use. When the pen is being used, the pen is removed from the cap and the cap is positioned at a stationary location near the writing surface and in the vicinity of the pen. In some examples, the sensors are linear CMOS arrays (available, for example, as 1024 pixel arrays from Photo Vision Systems, LLC (PVS) (P.O Box 509, Cortland, N.Y. 13045) (part number LIS1024)). Other linear CMOS sensors from PVS or other companies with the same or a different number of pixels could also be used. The analog output of each sensor is a sequence of 1024 analog signals, one from each sensor pixel.

A shown in FIG. 10, the holder may include a clip 62 to attach the holder to the edge of a pad of paper or a notebook.

A third sensor in the form of a photodiode 56 in the middle of the holder is used (among other things) to wake up the processor from a sleep mode (described below) when writing begins (e.g., the pen begins to emit light).

The third sensor signal may also be used to synchronize the circuitry in the pen with the circuitry in the sensor system. All three sensors are covered by IR filtering windows that face the writing surface.

As shown in FIG. 11, in one example, the front surface 100 of each of the main sensors has a vertical height 104 of 125 micrometers and a distance 106 from the front surface 108 of the lens 110 of four millimeters. The FOV 112 is 10 degrees. The pen tip 114 directs IR light into the FOV when the pen tip is on the paper 116.

As shown in FIG. 17, the two sensors 88. 90 are positioned 100 mm apart. Each of the sensors has a field of view (FOV) 94, 96 centered on an FOV axis 195, 197. The axes of the FOVs are not parallel but are toed in by an angle 199 to increase amount of overlap of the FOVs. The FOV of each sensor has a breadth of 150° in the horizontal (x-y) plane and a height of +/−5° in the vertical plane.

The FOVs do not cover some locations 101 on the writing surface that are close to the edge of the paper 303, and the FOVs are arranged so that the dead zone 98 does not extend more than 25 mm from the holder.

In another example of a pen holder, shown in FIG. 12, the sensors 117 and the lenses 119 are mounted on a holding bracket 121 with the IR filter 123 in front. The bracket is mounted on a printed circuit board 125 and is held in a housing 127. The centers of two main sensors are separated by 100 nm.

The light from the pen is collected from two sensors in order to identify the linear position of a modulated light source within a defined area (8.5×11 inches). The linear position may be computed by triangulation, a lookup table, polynomial approximation, or a combination of any of these.

The sensors are flat, linear, multi-pixel sensors. Different pixels of each of the sensors are illuminated when the light source is in different locations within the field. As the light source moves across the field, the corresponding movement of the light across the pixels of the sensors may not be linear, but the lack of linearity can be handled because the linear position may be computed by math and knowledge of optics combined with calibration data from the pair of sensors.

Instead of seeking a linear response from the sensors, we seek to maximize the light from within writing area that falls onto the sensors. Correct reproduction of writing is achieved by using parameters saved from the prior calibration procedure. The system uses, in some implementations (in the polynomial example shown below, the number of parameters can be greater) and supplied in a separate file) only four parameters to be passed from each pen to a host or server to process the data and linearize it. The particular calibration parameters for a pen are stored in the memory of the pen during production test and calibration. The parameters can also be stored on the server or on a PC used by the user instead of being passed on from the pen during downloads.

A lens or a set of lenses accompanies each sensor. The goals of the optical system are to maximize the efficiency of the light delivery, cover the entire field of view of the field, provide a uniform signal response across the entire field, and make the optical system as small and as cheap as possible. These goals are met in part by the following steps:

As shown in FIG. 30, a spherical lens 753 is used to focus the light on the sensor 755. The focal plane has a shape of a semicircle. The distance 759 from the lens to the sensor is optimized as are the other optical and mechanical properties of the lens including focal length, diameter, thickness, and material.

As shown in FIG. 31, an aspheric lens 760 may be designed with a focal point positioned on the sensor as the light source travels around the periphery of our field where the total power of the light source delivered to the sensor will be the weakest. Thus, this aspherical lens is designed to have a focal plane, which coincides with the plane of the sensor for only the points that are on the periphery of the page. Points within the page will be out of focus, but the amount of light falling onto the sensor will be significantly larger (closer to sensor or better angle), and the signal stronger.

As shown in FIG. 32 (which includes a top view above and a side view below), two perpendicular cylindrical lenses 770, 771 may be used instead of one lens. The length of the sensor limits the focal length of the lens in the horizontal axis. Therefore the lens diameter must be small and the lens must be located close to the sensor. In the vertical axis the lens may be located further from the sensor so the diameter can be larger. The larger diameter will allow for the collection of more light from the light source. The first cylinder (closer to the lens) will focus the light in the horizontal axis. This lens may be spherical because the spot size is not very important in the horizontal axis and will not vary that much within our given field. The second cylinder will have power in the vertical axis. It is important to focus as much light as possible on the sensor in the vertical dimension. For this to be true, the light must travel an equal distance from the cylinder to the sensor for all angles. To accomplish this, the second cylinder should be bent into an aspheric shape. Any of these two cylindrical lenses can be Fresnel lenses in order to save space.

In a more detailed example of a pen holder shown in FIGS. 13, 14, 15, and 16 the sensor system is held in a housing 79 that has a bottom 80 and a top 82. The bottom 80 holds a clip 62 (not shown). Paper can be inserted between the clip 62 and the bottom of the pen holder when a clip button 86 is depressed. When the button is released, the clip grasps the paper. The pen clip holds a 7 mm-thick stack of paper sheets or a standard notepad 83. The clip positions the pen holder on the paper so that the side 87 that faces the pen is vertical with a tilt of no more than +/−1°, thus assuring that the sensors will receive IR light from the pen when it is being used to write on the surface.

The holder can also just sit on top of paper or notebook without use of clip.

In the holder shown in FIGS. 13 through 16, the two sensors are mounted behind IR filtering windows 89, 91, and the photodiode 93 is mounted in the middle. An "ink well" 95 can receive the tip of the pen 97 for temporary storage, and a tube 99 provides a place to store the pen. The pen can be fully inserted into the tube and the batteries in the pen can be recharged during storage.

Various mechanisms for operating the clip are possible including the example shown in U.S. patent application Ser. No. 09/376,837, filed Aug. 18, 1999.

In one arrangement, the clip mechanism shown in FIG. 33 is used. The figure shows the steps in operating the mechanism, as follows.

Step 1: Mechanism is not activated.
Step 2: When the push button 780 presses on a spring 782, the latter releases the bracket 733, and lets the hinge spring 784 unfold the clip 785.
Step 3: Paper 786 is inserted between the clip and the body 787 of the pen holder.
Step 4: Lever 785 (the clip) is against the paper, and spring 788, which is significantly weaker than the hinge spring gives in and starts collapsing. The clip rotates around rotating point 789.
Step 5: The clip presses the paper against the bottom of the holder. Spring 788 collapses, and both levers move down by the amount of paper inserted.

A clip button can be used to transfer horizontal motion to vertical motion by a lever, which lowers the clip. Or, the button can push against a lever that rotates, transferring horizontal motion to vertical movement, which lowers a clip.

This mechanism is shown on FIG. 34. The clip has two vertical sliding bars 790, 791 connected to a horizontal bar 792. There is a spring 793 between the horizontal bar and the body of the holder. There are two vertical guides 794, 795 for the vertical bars to go up and down.

In the side view at the bottom of the figure, when the button is not depressed, the spring is all the way up and the clip is pressed against the penholder body (left side of the figure). When the button is depressed (right side of the figure), the spring is depressed and the clip (see the front view now), goes down between the slides. After paper is inserted and the button released, the spring pushes the clip up and the mechanism grabs the paper between the clip and the penholder body.

The button may move a lever in multiple axes to lower the clip. The button can activate a lever that rotates and moves linearly to lower the clip.

In another arrangement, shown in FIG. 36, the operator pushes down on a sliding panel (button) 901. The sliding button contacts the center of two spring-loaded levers 903, 905 moving these fulcrums down in the same direction of the button/panel. The bottom ends of the levers are fixed about rotating pins 907, 909 and thus the bottom? ends move downward about twice the distance of the button. The top ends of the levers are fitted with pins 911, 913, which ride in guide slots 915, 917 and in two tabs that are bent up vertically from the bottom clip. The end result is a movement vertically downward of the clip, which is about twice the distance as the button/panel travel.

Alternatively, as shown in FIG. 35, the sliding panel 930 may be placed in a horizontal orientation and, by means of a rigid flexible belt, achieve the desired result with a horizontal pushing motion as opposed to the vertical motion of the button.

As shown in FIG. 37, another approach may be achieved by a pulling motion of the button 951 if the forces acting on the two levers 953, 955 in the mechanism is moved from the middle of the levers to the bottom ends, and the fulcrums of the levers are moved to a point ⅓ the distance from the top? ends to the bottom? ends. This would provide the necessary mechanical advantage to maintain the 2:1 ratio of the distance the clip moves to the travel of the button.

In both mechanisms, the location of pivoting points to points of applying force on levers can be used to increase mechanical displacement of the clip.

Pen Holder Circuitry

A circuit block diagram of the holder is shown in FIG. 18. An ASIC 205 is powered by a battery 511, or from an AC adaptor 513, or from a USB connection to a host computer 211. The two CMOS sensors 201, 203 have outputs that are connected 165, 167 through operational amplifiers 169, 171 through a multiplexer 180 and a 12-bit A-to-D converter to the ASIC.

The analog output of the CMOS sensor is subjected to signal processing in the form of offset cancellation and automatic gain control. The signal-to-noise ratio requirements of the processing implies use of 5V power for the CMOS sensors and all analog signal processing circuitry. Some A/D converters are operated at a 2.5v reference, and the signal from the CMOS sensor may scaled down by factor of 2 using a resistive divider.

The ASIC could be model Clarity 2B from Sound Vision, located in Framingham, Mass.) and is based on an ARM7 core. The ASIC firmware implements data acquisition, data storage, file system management, I/O service (LEDs and switches), RS232, and USB communications, power management for idle and sleep modes, optical calibration, and test mode.

The multiplexer enables the A-to-D converter 182 to alternate between the two CMOS arrays 201 and 203 to minimize the time skew between the two sensors. The clock frequency of the A-to-D converter is 1.2 MHz. Each CMOS sensor is clocked at 600 kHz. Data acquisition uses the ASIC's direct memory access (DMA) facility.

A wakeup input of the ASIC is driven by a PLL 513 that receives an input signal from the photodiode 515. The photodiode is driven by modulated light from the pen.

The ASIC is clocked by a 48 MHz crystal and a clock divider 517. I/O features are provided through a USB port 211 and an RS232/IrDA port 209. Firmware and data are processed in SDRAM 207 and stored in a flash memory 519. An optional LCD 172 can be provided for user display.

USB provides two data transfer modes from the holder to a PC: bulk and real-time. Real time transfer is interrupt driven and is used for keyboard and mouse replacement applications.

A dual function transceiver is used to implement both RS232 and IrDA communication. The RS232 communication is used as a dial up connection to the server over cellular phone.

The holder can support different types of external connections, including USB, Serial, Parallel, IrDA, Bluetooth, Firewire, or any kind of communication port. When powered down, if the holder is connected to any external device, it has a capability to automatically power itself up. It also has a capability to power itself down when an external device is disconnected. There are two types of connections for the holder:

One connection is an external storage type of connection. Such a connection is made with a computer, or other device, called host, that is capable of displaying graphics and has an adequate user interface. While connected to a host device, the holder behaves as an external storage device. A user of the host device can browse through the holder file system, copying, viewing, and editing files previously collected by the holder. The software residing on the host is capable of converting, displaying, printing, and editing on the host screen files stored on the holder or copied from the holder to the host. While connected to the host, the pen can also behave as a real-time input device.

The other type of a connection is with a portable internet or modem enabled device, such as a cellular phone. Upon detecting such a connection, the pen holder automatically initiates transmission of all the data previously collected to be sent as e-mail or fax.

The optional LCD display notifies a user of the pen's status, for example, with respect to connections and downloads over Internet-ready cellular phones where communications are not reliable. This display can be mounted on top of the holder. If an LCD is used, the LED may not be needed.

A single three-color (green, yellow, red) LED 170 (see also FIG. 18) indicates normal acquisition of writing data, downloads to a PC and over cellular phone, and monitoring of battery and memory status.

Pen, clip, and inkwell switches 141, 143, and 145 are used to control the ASIC and a reset switch 147 is used to reset the ASIC.

FIG. 19 shows a state diagram of the states of operation of the invention. Shaded blocks indicate study states. Clear blocks indicate transition states. Among other things, the figure identifies the manner in which the multicolor LED is used to indicate the state of operation.

At power up, the green light blinks as many times as there are pages in memory. The green light is not on at power up when the memory is empty, and stops blinking after 30 seconds or sooner if the user starts to write.

During writing, when data acquisition is proceeding properly, the LED is pale green. The green light goes off for faulty acquisition triggered by, for example, obstructed light, a pen that is off the writing surface, or a discharged battery.

Low battery status is indicated by a blinking yellow light when no writing is occurring. However, when writing, the yellow light blinks intermittently with pale green if the battery is low.

Memory nearly full status is indicated by a double-blink of the yellow light when writing is not occurring and a yellow light blinking intermittently with pale green when writing is occurring.

Download status (which may start independently whether the pen is in or out of the holder or ink well) is indicated by a bright green light after successful download. Blinking green, signifies that download is in progress. When no service is available for downloading or the download signal is week, a red light blinks. The red light double blinks for an Internet problem, for example when a server is down. A triple blinking red light indicates a wrong setup for communication including a wrong user ID or server address. This requires a code sent back to pen from server after unsuccessful match of data from pen with account on database.

Battery recharge status is indicated by a solid green light after a successful recharge and by a multiple blinking green light when the holder is plugged into the AC adapter and charging. A combination of signals from the battery monitoring circuitry and the fast charge signal from a charger (high when not charging) can identify the state, whether charge in process or trickle charge.

The pen can be used during recharging. If the pen is removed from the ink well and is used during recharging, the yellow light is replaced with all normal indicator lights described above.

Writing to flash status is indicated by a continuous yellow light.

All errors are reset by activation of any of the two pen or ink well switches mentioned later. The only exception is when a download was successful, and the user started writing. Then the constant bright green light will switch to a pale green light.

In sleep mode, all trouble indications, low memory, and low battery continue as in the normal mode. All download troubles stay on also.

If the ASIC needs to indicate low memory or low battery conditions during power up, the power up indications take the priority. Then the trouble indications are displayed up after a 30 second timeout. If the ASIC needs to indicate low memory or low battery conditions during download, the download indications take precedence. After a reset of download status, the trouble indications are displayed.

Of the four switches on the holder, the clip switch 141 indicates that the clip is being opened and closed as a way to notify the circuitry that the user is beginning a new page. The pen switch 143 indicates when pen is in or out of the holder. An ink well switch 145 indicates when the pen is in or out of the ink well. The reset switch 147 is hidden but accessible through a hole in the bottom using a paper clip.

The pen switch and the inkwell switch indicate when the pen is in the holder or the inkwell and remove power from the data acquisition and storage electronics when the pen is in the holder or the inkwell. The pen switch also opens new files (or pages) on activation, while the ink well switch does not.

The clip switch indicates when the clip is activated, as well as a new page and beginning of a new file (each page is a file).

The reset switch resets the ASIC if the software freezes. The switches are normally ON as follows:

| | |
|---|---|
| Pen | ON when the pen is out of the holder. |
| Ink Well | ON when the pen is out of the ink well. |
| Clip | ON when the clip button is released. |
| Reset | ON when switch is depressed. |

The holder also includes a miniature connector for USB and RS232 interfaces as well as an antenna for use with Bluetooth or other wireless technology. The USB and RS232 connector are also connected to the wake-up power circuitry so that pen holder can power itself up when cable is plugged into the miniature connector.

Angle signals generated by the sensors are processed by the ASIC and stored in flash for later transmission to other devices such as cellular phones, PDAs, and PCs (not shown) where they can be used for handwriting recognition or to capture drawings. The transmission can be done using, for example, USB, RS232, IrDA, or Bluetooth protocols.

File System

The flash memory is structured as a FAT (file allocation table)-compatible file system, where each file represents one page of handwritten information. Each file has a unique name of 12 characters, including 3 characters of extension and a separating "dot".

Data File Creation

When a user brings the pen into writing mode by taking the pen out of the holder, or by pressing the new page clip button if the pen is already in the writing mode, a new file is created, and the subsequent writing is saved in a new file. If the user does not actually do any more writing after new file was created, the newly created file is deleted, and the next time pen is brought to the writing mode, the same file name will be reused.

During data acquisition, uncompressed data is stored in a temporary buffer in SDRAM and compressed by a data store task before being stored into a file in flash memory. Each page is stored in a separate file. A previous page is compressed before new page acquisition is started.

Data File Format

We use a binary compressed format based on a variable rate Huffman encoding with cubical appoximation. Such a format comprises encoded data coordinates and timestamps. Before being compressed, the file has the following format:

The file is structured in four byte segments. Each segment corresponds to either one pixel or one timestamp. Each pixel has a most significant bit (MSB) of zero, and consists of two 15-bit numbers that are the sub coordinates of corresponding CMOS sensors. Timestamps are distinguished by a MSB of one, and can store either full date and time of the next pixel (called full timestamp), or incremental counter of pixels since the last full timestamp.

Each file begins with the full timestamp. An incremental timestamp is inserted in the end of every written stroke. Because all pixels are scanned evenly in time, such a combination of timestamps enables efficiently recover the whole history of handwriting in the future processing.

Downloading of Data

When the holder is connected to a PC using a USB cable, the PC automatically recognizes the holder as a PC-compatible USB device, and the contents of the holder file system becomes visible for the PC through the PC-file system extension. The user can browse through it and view the files using a handwriting viewer.

When an RS232 cable is connected between the holder and, for example, a cellular phone, the holder automatically powers itself up, and starts transmission of data files from the memory of the holder to the phone. IR transmission of data to the phone could also be done.

The data is sent in the compressed form to the server and is kept there until requested for an addressee. Then it is decompressed and translated into one of the following formats: .tif, .pdf, .gif, .ps specific to e-mail or FAX service.

Sensor Signal Preprocessing

In some examples, a preprocessor (not shown) can be used for background cancellation, and storage into flash memory, while the ASIC processor performs all communication and I/O functions. The preprocessor can be implemented as a programmable device such as PLD, FPGA or digital ASIC or a DSP. In this example, a frequency multiplication is performed to generate a high-frequency pixel clock and a clock for the preprocessor from the pen LED modulation frequency that is recovered by the PLL.

The second processor can be a processor of another portable device such as a cellular phone or PDA.

Data Acquisition

Position data is collected in a succession of samples spaced 10 milliseconds apart to adequately capture writing motion at a typical speed of 5 cm per seconds for a resolution of 0.5 mm. The ASIC operates as a master, generating the clock and all necessary signals for the sensors.

The sensors in the holder use the pixel clock from the ASIC. A frame signal is generated by each sensor and read back into the ASIC. Thus, the LED pulses from the pen and the signal acquisition performed on the holder are not synchronized in some implementations. In other examples, the data acquisition is synchronized with the pen modulation frequency. Synchronization significantly improves angle resolution.

In each sampling cycle in which the pen position coordinates are obtained, data is captured from both sensors. One version of the background cancellation algorithm (asynchronous with pen) requires capturing three consecutive frames at each sensor. An additional frame is used by the ASIC architecture for sensor reset.

To minimize any skew between coordinates from the two sensors, the multiplexer data acquisition alternates between the two sensors for each pixel.

Operating the A-to-D converter at a sampling rate of 1.2 MHz maximum and alternating between the two sensors allows for a pixel sampling frequency up to 600 kHz. Each CMOS array has 1024+4 pixels, which produces a frame rate of approximately 600 Hz. A slower rate of 300 Hz might be used to achieve more pixel exposure to light and accordingly better signal-to-noise ratio.

Each sensor operates in a mode in which each pixel is reset after being read into A/D converter.

The IR LED duty cycle is 50% out of three frame intervals. For that duty cycle, the LED frequency cannot exceed 200 Hz.

For purposes of cancellation of background noise and low frequency interference without synchronization, three data frames of 1024 pixels are required, as described below.

In addition to the main analog output each CMOS delivers END_FRAME signals. From each CMOS the acquisition cycle for each of the three sequential frames of data is started by the END_FRAME signal, which coincides with the last pixel of the frame. Each A-to-D conversion occurs on the falling edge of the PLXEL_CLOCK pulse. The total number of points is essentially (1024+4)*3, where 1024 is the length of the CMOS array, 4 is the number of clock pulses between the END_FRAME signal and the beginning of the next frame, and 3 is the number of sequential frames needed to implement background compensation.

From the acquired waveform, the ASIC extracts three arrays, each corresponding to 1024 pixels. The arrays must be correctly aligned so that the i-th element in each of them corresponds to the i-th pixel of the CMOS.

Let us call the arrays A1, A2, and A3. Background compensation is based on the fact that the LED in the pen is modulated with a frequency equal to ⅓ of the frame rate and with a 50% duty cycle. To achieve background compensation, the following calculations are performed element-wise on the arrays: A12=abs(A1−A2); A23=abs(A2−A3); A13=abs(A1−A3). Then arrays A12, A13 and A23 are added element-wise to form a new array called A. This array A is 1024 elements long and carries the beam information with the background removed.

To reliably get rid of the large peaks appearing in the pixel waveform during the END_FRAME pulses, subarrays shorter than 1024-elements long can be extracted, for example, three 1020-element long subarrays, that start at pixels 3, 1032 and 2061 (base 0).

The readouts of the two sensors are digitized simultaneously (or quasi-simultaneously when using only one A-to-D converter with a multiplexer).

Finding Peak Position Along CMOS Array with Subpixel Resolution

Determining the angle of receipt of the light at each of the sensors depends on determining the pixel location of the peak light intensity along the array of the sensor. The algorithm to find peak position with subpixel resolution uses two parameters: T, the intensity threshold in volts and W, the window width in pixels. Typical values of these parameters are T=0.1 V and W=15.

As an initial step, the peak value and its index in the array A are found, call them Amax and M. If either of the two Amax values (corresponding to the two sensors) is smaller than T, then the point is discarded. In that instance the LED is considered to be off with the pen not touching the paper. If M<W/2 or M>(1024−W/2), the point is discarded as being too close to the edge of the field of view.

From A, extract a W-element-long subarray starting from element M−W/2. Find its fractional center of gravity as follows: create an array of running sum of elements of the extracted subarray (call it S). Take the value of its last element. Divide it by 2. Find the fractional index of the position of this value in S using linear interpolation/lookup. Add M−W/2 to this value. This will be the fractional index of the center of gravity of the beam in the original 1024-element array. Invert its sign and add 512 (in the case of an A that is 1024 elements long or 510 in the case of an A that is 510 elements long). The result, P, is the fractional position of the beam with respect to the axis of the sensor (in pixels).

The use of a subpixel algorithm permits an increase of the pixel resolution by a factor of 8 to 10.

Calculating Light Source Angle with Respect to Sensor Axis

As a result of the previous calculation, we have the angular position of the beam for each sensor (in pixels). We call them Pleft and Pright (looking at the sensors from the pen point of view). We recalculate the Ps in radians based on the sensor geometry. In one example, the pixel pitch L=7.77 microns, the distance from the lens to the CMOS is D=4800 microns (typical), the refraction coefficient of the lens material is N (1.5 for glass, 1.4 for plastic, 1.8 for SF6). Parameters, distance D, index of refraction N, and horizontal offset, Off, will be adjusted using calibration data for correct mapping of writing.

Then the angle (in radians) is calculated as F=arcsin (N*sin(arctan((P*L)/D))).

As illustrated in FIG. 22, the following parameters are required for calculating the light source position in Cartesian coordinates:

Sensor convergence angle (toe-in) C (radians), typically 30/57

Base B, the distance between sensors (mm); typically 150

Left sensor: Kleft=tan (C−Fleft)

Right sensor: Kright=tan (C+Fright)

X (mm)=B*Kright/(Kleft+Kright);

Y (mm)=Kleft*X.

Criteria for Accepting a Point as Valid

Points are stored as coordinate pairs (X,Y). When saving points into the memory, coordinates are saved continuously, except as follows:

If the signal is found to be below the threshold (as described above), then a marker (a pair of unique values) is written into the memory, for example (NaN,NaN) which will signify later that the pen was lifted (NaN stands for not-a-number as defined in the IEEE arithmetic standard). After that, no new points are added to the file until the signal is detected again. This approach allows the pen to tell the playback program exactly where to interrupt the restored trajectory line.

If the signal is significant, but the pen position did not change significantly as compared to the previous position, then no new point is added to the memory, but unlike the case of no signal, no markers are written to the memory. The size of the move squared is calculated as $(X1-X0)^2+(Y1-Y0)^2$. The typical value for the significance of the move squared is 0.04 mm$^2$.

No timestamps are included in a file because this information is not required for restoration of the pen trajectory.

Coordinates are stored in the temporary buffer and are compressed only before storing in flash memory. Each page is stored in a separate file. Therefore, there is no need for an end of page mark.

Full time stamps will be inserted before the first valid pixel. All other timestamps on a page (file) will be incremental and inserted whenever the pen is lifted off the paper. Only one time stamp is inserted regardless of how long the pen was off the paper.

Sleep Modes

When the pen is taken out of the holder or the ink well for writing, the ASIC turns on in the sleep mode and waits until an optical signal is detected from the pen.

When the holder is awake and it detects that writing is interrupted for a predefined period of time, the holder returns to the power-saving sleep mode. The ASIC enters sleep mode by reducing its normal 48 MHz clock frequency to 750 kHz. SDRAM update refresh rate also changes accordingly to keep data intact.

The holder power is almost entirely off when the pen is inside the holder or in the inkwell. RS232 receiver and USB monitoring circuits consume very little standby current. These circuits wake up and enable power to the rest of the electronics on detection of active levels for RS232 or USB, when connected to a cellular phone over the cable or by USB cable to a PC. The pen holder is completely off when the pen is inside the holder.

In sleep mode, the only function of the holder electronics is to watch for a WAKEUP input from photodiode and associated PLL circuitry indicating that the pen is active. In sleep mode, the pen consumes little power between the time intervals when it checks the photodiode.

During writing, the pen transmits modulated IR pulses. The pulses are detected at the holder causing the PLL to wake up the processor, which starts normal acquisition mode as soon as the ASIC switches back to the 48 MHz system clock.

Phase Lock Loop (PLL)

When the modulated IR light from the pen is being detected, the modulation clock of the pen LED (represented by 1 kHz bursts in the output light) is extracted using PLL circuitry 132 tuned to the modulation frequency of the IR light.

All acquired data is initially stored in SDRAM 134 using DMA. The update rate of the SDRAM remains unchanged when going from acquisition mode to sleep mode. The memory requirement is 1 Mbyte for 50 pages of compressed or 10 pages of uncompressed data. The 5:1 compression algorithm must have fast and computationally simple coding with no limitation on decoding.

The acquired data is initially stored in SDRAM during writing. When the pen is returned to the ink well or the pen, or when the new page switch 136 is activated, the ASIC writes all data from SDRAM into flash memory 138. Only a short time is needed to write a full page of hand-written text data into flash. The transfer is indicated to the user by lighting a yellow LED 140 on the holder. 8 Mbit flash memory stores compressed files representing a maximum of 50 pages of handwritten text. The compression algorithm allows at least 6-to-1 compression without observable distortion of text.

Power for the Holder

The holder is powered by two AA NiMH batteries connected in series to provide 3.0V. When the pen is in the ink well or the holder, the pen's three NiCd batteries are recharged by a trickle current. The pen batteries have a large capacity and are almost never recharged completely. The trickle current charging is enough to maintain the battery charge. A special mode is provided when the pen and the pen holder are both in the charger to charge all the batteries including the pen batteries with the full charging current.

Battery life is ten handwritten pages or a week of average use without compression of data for storage in memory. An average user may write 2 characters per sec, or 120 char/min, or 7200 char/hr. The average handwritten page is approximately 700 characters. To produce ten pages, the battery must work for 5 hours.

When connected to a USB port, the holder can get power from the USB host. The charge on batteries is maintained at a high enough level to start the circuitry prior to switching to USB power. Power from the USB connector is provided only after the ASIC establishes communication over the USB link and notifies a PC on the other end of the USB link that the connection is "high power".

In response, the PC provides up to 0.5 A. Battery charging current is set at 0.4 A and is monitored to switch the charger into trickle charge.

The holder circuitry is activated when the pen is taken out of the holder or the ink well. Some holder circuitry, like the RS232 driver and wake-up power circuitry take power directly from the battery.

Other circuitry takes power from a 3.3v supply generated by an on-board switching regulator from the battery voltage of 2 to 3 volts. When connected to a USB link, the 3.3v is generated from USB power. 5v is generated for the analog circuitry from the 3.3v supply.

Synchronization of Pen and Holder

Synchronization of the pen and the pen receiver can produce a better signal resolution and correspondingly better angle resolution and resolution of writing.

As shown in FIG. 20, for synchronization, the pen produces periodic bursts 401 of higher frequency pulses, such as pulses at 1–10 kHz (suggest we show some timing diagrams) that can be easily detected by the PLL. The PLL will detect not only the actual modulation clock but also its phase, which enables a signal to be generated to start data acquisition and synchronize it with the pen LED.

As shown in FIG. 21, the control signals, LED_ON and LED_OFF, trigger signal acquisition. In such a case, only two frames will be required for background cancellation, one for the IR signal when the pen LED is on, and the other, when the LED is off. For a CMOS sensor, a shutter mode is provided that resets all pixels at one time.

Having only two frames per sample raises the sample rate and resolution and may allow the processor to go into idle mode in between the samples to save power.

Use of 2-D CMOS Arrays

Vendors to manufacturers of digital sensors produce small power-saving sensors and sensors along with the image processing circuitry that can be integrated into the pen on paper or 3-D pen applications.

3-D positioning of a light spot is possible using two 2-D photo arrays. Projection of a point of light onto two planes defines a single point in 3-D space. When a trajectory of 3D positions is available, motion of an IR pointer-pen can control a 3-D object on a PC screen. When the pen moves in space, it drags or rotates the object in any direction.

Slave Mode

In other implementations, using the ARM7 based ASIC in a slave mode, the DMA can handle the data acquisition, but the vertical synchronization signals are provided by the pen light detection circuitry (PLL).

Two Analog Channels Alternative

Two separate channels can be used for analog signal processing and A-to-D conversion. Such an implementation could use more economical parts that do not require fast settling times, frequency bandwidth and slew rate.

Frame Varying Alternative

CMOS sensors have a limited dynamic range. Although an adjustable electronic gain may be used for both CMOSs simultaneously after the output of the CMOSs, this arrangement may be not be ideal, for two reasons.

First, the signals for the two CMOSs may be different in magnitude when the pen is being moved in certain areas of the paper, so changing the gain for both may fix one signal while degrading another signal to an unacceptable level. To get suitable signals across the page, it is useful to have separate gains for each CMOS. Second, using an electronic gain does not do anything to prevent saturation of the actual CMOS, which is unavoidable with the area that the sensors must cover.

The gain of the CMOS can be changed by changing the exposure rate for each CMOS independently. As shown in FIG. 21, the pen transmission rate remains 100 Hz, while the frame rate 601 of the CMOS is shifted among 300 Hz, 600 Hz, and 1200 Hz. At 300 Hz, the background cancellation is straightforward. For 600 Hz, the algorithm uses every other frame (frames 1, 3, and 5). For 1200 Hz, the algorithm uses every fourth frame (frames 1, 5, and 9). The pixel rates are 300 kHz, 600 kHz, and 1.2 MHz. Changing the frame rate can be accomplished by the ASIC without any additional hardware.

Each CMOS may be connected directly to its own ADC or both could be connected to one ADC that would be able to handle 1.5 megasamples/sec and have a 4V reference voltage. The ADCs then may feed into a digital multiplexer so that the signals can be fed into the ASIC.

PSD Based Approach

Instead of CMOS arrays, two PSDs may be used to detect the IR light from the pen. Each PSD determines the angle between the page and a line of sight between the pen and the PSD. The two angles from the two PSDs and the distance between the PSDs are sufficient to compute the location of the tip of the pen.

Even with IR filters, ambient light will introduce errors in PSD positioning measurements. To reduce the errors, the IR light at the pen is modulated to generate pulses at a modulation frequency and with a 50% duty cycle, as described above.

Two analog techniques may be used to discriminate the PSD signal that is translated into the angle for use in triangulation.

In one approach, called synchronous demodulation and used in instrumentation electronics, the incident synchronous light pulses are chopped at the light modulation frequency, and opposite gains (+1 and −1 respectively) are applied to those signals, depending on whether the LED is on or the LED is off. This allows for subtraction of background noise. Then the signal is integrated using a time constant that it is responsive to the signal variations on one hand and averages out noise on the other. In one example, the modulation frequency could be 3 kHz, and the pulse amplitude could be ILEDpeak=Xma.

A second approach to discrimination uses a sample and hold technique. The shape of the optical signal has a 50% duty cycle at the 3 kHz modulation frequency, as before, but also has a significantly stronger short pulse imposed on the modulation frequency. The modulation frequency is discriminated using a PLL and is used to trigger the sample and hold circuitry, while the strong optical pulse is actually sampled. The pulse amplitude is ILEDpeak=Xma and the pulse duration T=Y usec.

PSDs are extremely accurate in sensing and measuring the position of light on their photosensitive surfaces. They are inexpensive and require very little power consumption. The PSD implementation is also simpler than the CMOS one.

As shown in FIG. 23, current-to-voltage transformation is done on each of four channels, two for each PSD. The four analog signals pass through low frequency filtering 605, synchronous detection 607, integration 609, and digitization 611 by microcontroller 613 (12-bit A/D converters). A-to-D conversion is performed at a 100 Hz sampling rate. The processor is active when the pen is making a trace on paper. The processor performs signal acquisition and periodic storage into flash memory. FIG. 24 shows a system timing diagram. When no trace is being made, the microcontroller enters the idle mode, and after an arbitrary period of time, the sleep mode.

The microcontroller is awakened from idle mode or sleep mode by either an interrupt or polling (TBD) of the following inputs: one of the four analog channels, when the signal at its modulation frequency exceeds a certain threshold of the comparator; an interrupt from a USB port when presence of activity from a host is detected; one of its key buttons is pushed.

When the RAM becomes full or/and the boundary of a flash memory page is reached, the processor writes data from RAM to flash memory. If acquisition continues and the page is full, the microcontroller start writing to flash. However, most of the flash operations should be done during idle cycles when there is no writing.

Each PSD has two channels of analog signal processing. Each channel has a current-to-voltage converter whose output is AC coupled into the first gain amplifier. The signal is chopped with the modulated frequency of the pulsing IR LED (on pen), currently 1 kHz.

When LED emits light, the chopper has a gain of +1. When there is no light, the gain is −1, therefore the signal is synchronously demodulated. The last stage is an integrator, whose output is close to DC. More precisely, it is a sawtooth waveform due to charging and discharging of the integrating capacitor in the feedback of the amplifier.

The A/D converter, either a PC-based DAQ or an A/D of the microcontroller, samples the output at specified time intervals synchronously with the modulation frequency to cancel errors due to saw-tooth waveforms.

To use all 12 bits of the A/D converter resolution, a dynamic change in reference voltage for the converter is used. The microcontroller always starts reading the A/D channels with the highest range and then divides it in half until the range is the most optimum for the signal.

The chopper amplifier uses a replica of the modulation frequency detected with an analog circuitry on each channel (four channels altogether). This signal is taken after the second gain stage, processed for detection of signal transitions, and then the recovered modulation pulses pass through OR gate to drive the chopper amplifier analog switch to change its gain between +1 and −1.

Phase Shift using Photo Diodes, Rotating Pen Tip

As shown in FIG. 25, if a rotating light source 617 is used at the tip of the pen, it is possible to measure the phase difference among signals on three photodiodes 619, 620, 621 on the holder to find the pen position.

The rotating light on the pen tip can be realized using several (e.g., eight) LEDs 623 that are triggered at times spaced apart by T/N, where T is the overall time period of the LED cycle, and N (e.g., 8) is the number of LEDs.

The signal source is at some location on an X-Y plane. Two signal detectors 619, 620 are located at two other fixed locations on the same plane. If the signal source has a radiation pattern such that the signal radiated in the positive X direction is in phase quadrature to the signal radiated in the Y direction (spatially rotating at the signal frequency), and the propagation delay is negligible compared to the signal period, then the angle A1, formed by two intersecting lines 637, 639 drawn from the detectors to the signal source will be the same as the phase difference between the signals measures at the detectors.

If a third fixed location detector 621 is added, then a second angle A2 will be formed as three lines intersect at the signal source. Again, the angle A2 between the lines at the intersection will be the same as the phase difference of the signal measured between the detectors. By applying some basic trigonometry, it becomes possible to find the location of the signal source in the X-Y plane by knowing the fixed locations of the detectors and measuring the phase differences of the signals at the detectors. If the three detectors are arranged in a straight line with equal distances between them, the computation becomes trivial.

Referring to FIG. 26, the calculation of B and A angles based on the angles measured by the sensors, "a" and "b" is as follows:

Having: $a/A=d/R$ (1)

and $b/B=d/R$ (2)

and $B+A+b+a=180°$ (3), from basic geometrical theorems,

We get: $B/A=b/a$, (4), and accordingly $B=A\times b/a$ (5)

$A=B\times a/b$ (6);

Now plugging (3) into (5) and (6) we get:

$A\times b/a+A+b+a=180°$ (7)

and $B\times a/b+B+b+a=180°$ (8);

We solve them for A and B:

$A=a\times(180°-b-a)/(a+b)$ (9)

$B=b\times(180°-b-a)/(a+b)$ (10)

The rotating light on the pen tip can be realized using several (e.g., eight) LEDs 623 that are triggered at times spaced apart by T/N, where T is the overall time period of the LED cycle, and N is the number of LEDs. For example, eight light emitting diodes (LED) could be arranged in a circle pointing outward, spaced 45 degrees apart and driven by an signal oscillator with a 45 degree phase difference between adjacent LEDs.

As shown in FIGS. 27 and 28, the three detectors 641 could be Positive Intrinsic region Negative (PIN) diode optical detectors driving a signal processing chain 642 consisting of a trans-impedance amplifier 643 and a high gain limiter 645 to remove any amplitude modulation in the detected signals.

Phase detection could be accomplished with two edge-triggered one bit Up-Down counter type phase detectors 649, two binary counters and a clock running several decades above the signal frequency. If the counters are connected such that they count up with every clock cycle where the one sensor leads the phase of the other and count down when the phase lags, and a third counter is set to count up continuously, then a microprocessor can periodically read and reset all the counters, scaling the reading from the two counters connected to the phase detectors (dividing by) by the reading from the continuously running counter. This number is the phase difference (in gradients) between the three sensors and as such, the angles between the intersection of the lines from the sensors to the source. It is then a trivial task to calculate the location of the source relative to the sensors.

Pen Light Activation Switch Alternatives

Different pen light activation methods can be used, including conductive rubber, pressure sensitive materials or strain gauges.

Pressure sensitive material allows for a variable pressure threshold and coordination of the switching point with the ink flow. This would prevent loss of data when the ink is making a trace while the pen is not active yet. Most ball point refills release ink at 20 to 30 gf +/-30%, while an off-the-shelf switch activates at 50 to 100 gf and +/-40 gf, for example, making a reliable coordination of ink flow and data capture impossible. Special refills can be also designed to prevent ink flow below 50 gf that might enable the use of off-the-shelf chip switches.

Pen Optics Alternatives

Other approaches for emitting light from the tip of the pen are possible. Optical fibers could be used to collect light from an LED and emit it in a 360° pattern around the tip of the pen. Individual LED chips could be located around the tip of the pen and emit light through a half reflective lens/window, such that 50% of light is emitted and the other 50% is reflected internally to be mixed with other light, ultimately producing uniform 360° illumination. Light could be mixed from a single LED using special rings that redistribute the light for uniformity.

Passive Pen Alternative

The pen may be completely passive if the IR light source is located next to the sensor. A reflective surface would be provided near or at the tip of pen. The sensors would see reflection of IR light from the tip of the pen and compute angles as described above.

The tip of the pen must be reflective only when pressed against paper and ink is forming traces. Otherwise there will be erroneous traces in digital form with no corresponding traces on paper.

Activation of the reflective mechanism can be mechanical or electrical. In a mechanical implementation, pressure on the tip will open up a sheath and expose reflective surface around the tip. In a electrical implementation, pressure on the tip will activate liquid crystals or other photo technology that will make that material reflective to light. Reflection from other objects, like fingernails and rings, can be handled by using polarized IR light.

Passive Pen Holder

Conversely, the holder may have two reflectors, while the pen both emits light and receives reflections. The sensing element on the pen could be a 2-dimensional PSD or CMOS array. If flat 2-D sensors are used, the pen would not be omni-directional, but it would be possible to make a custom circular 2-D sensor that would have 360° coverage.

Keyboard and Mouse Replacement Architecture

The pen described above can be used to replace standard PC input devices such as a mouse and a keyboard.

When used as a replacement for a keyboard or a mouse, the sheet of paper, plastic or other flat surface, may bear a printed keyboard pattern that will serve as a keyboard and mouse pad for, e.g., PC's, handheld computers, and cellular phones.

Users today are, for the most part, limited to keyboards, keypads or stylus input on screens when inputting data into PC's, handheld computers or cell phones. Keyboards are efficient and convenient when they are full size but do not lend themselves to portable devices such as palm computers and cellular phones. Cell phone keypads, while efficient for dialing phone numbers, require excessive keystrokes when trying to generate ASCII letters and symbols, making any type of data input a very tedious and time-consuming process. Styli on screen input with palm devices requires either that the user use unique writing styles such as "graffiti" in order to minimize the amount of handwriting recognition needed on the device or that the user tap on small virtual keyboards represented on the screen. Both styli approaches often result in incorrect input, which limits the functionality of these devices.

An electronic pen can be used in a mode that provides a highly reliable method for inputting text characters in addition to recording handwritten images and lines. A sheet of paper or any other surface (with or without a printed pattern of a keyboard) is all that users need to type with a pen.

The spatial transcription capabilities of the electronic pen together with the keyboard template are used to substitute for the mouse or keyboard.

The paper keyboard can be multiple sizes based on the user's needs. The size can range from an 8½×11 sheet of paper to the size of a cell phone cover. The user first selects the size of keyboard he desires and then calibrates by touching the pen to specified characters on the keyboard. To type a message, the user touches the tip of the pen on the appropriate keys. When the pen touches the square area of the paper that corresponds to a certain letter the location of the tip of pen is computed and the designated letter is determined. This approach allows the user to generate text on a computing device with an electronic pen without any dependency on handwriting recognition software.

This approach is an improvement over the built in keypads, software keyboards or styli on screen input approaches currently used on ever-shrinking personal appliances. The paper keyboard allows the user to enter messages on handhelds and cellular phones faster and more reliably than with alternative approaches. The paper can also be used in other modes to record drawings and handwritten notes and images. When done, the paper keyboard can be discarded or folded for future use.

In addition to characters, the keyboard can also contain shortcut keys and function keys that enable more efficient interaction with a small device. Short cut keys can minimize the number of keystrokes required to enable commands. Short cut keys can be customized based on the type of device being input into.

The keyboard can also incorporate a section that serves as a paper mouse pad. Using the electronic pen's spatial transcription capabilities, the user can move the pen within a designated square space on the paper that in turn moves a pointer on the screen of a device. The paper mouse thus serves as an alternative to keys and styli on screens as a means for navigating on the screen of a handheld or cellular phone.

The paper keyboard also enables flexibility in inputting foreign characters. Keyboards can be created for several languages such as Japanese, Korean, Spanish, French and Russian. A user can simply print out a new keyboard if they desire to input a different alphabet.

As shown in FIG. 29, to type a message, the user touches the tip of the pen 701 on the appropriate keys 703 printed on a paper keyboard 705. The positions at which the pen is touched are tracked by tracker 707, converted to text and then sent to a portable device such as a cellular phone 711 or a palm computer 709.

The keyboard can be folded or discarded after the use.

In other implementations, there is no printed paper keyboard; rather the tracked motions of the pen can be used through handwriting recognition to derive text, commands, and drawings as the pen is used for writing on any surface.

In one implementation of this approach, the mouse and keyboard can continue to be used and the pen serves as an alternative. The pen can operate in either a "pointing device" (mouse) or a "character input" (keyboard) mode. The mode can be selected by a dedicated hardware switch or button, on a pen holder or pen, or by sending a command from PC to a holder.

In mouse mode, pen operation is indistinguishable from that of a secondary (USB) mouse. It is a relative positioning pointing device moving the cursor on the screen. In keyboard mode, pen input can be received by a specially designed application using an available character recognizer to convert graphical input (strokes) into characters. Other applications are not aware of the pen presence and continue to operate using the regular (legacy) keyboard.

In another approach, the pen is the only input device to the system. In this case, a software driver stack is modified to provide keyboard functionality system-wide. Mouse-mode operation is not affected and is identical to the first-described approach. When operating in keyboard mode, pen input is recognized by available handwriting recognition software built into a keyboard filter driver and then delivered to system input queue in a similar way to traditional keyboard input.

This second approach requires a platform usability model and (most likely) modification of certain system components such as Basic Input/Output System (BIOS).

Both approaches raise human factor and usability issues. In particular, there are two basic approaches to handwriting recognition: discrete (single character at a time) and continuous (word, phrase or page at a time). In the former case, the user must continuously rely on computer screen output for feedback. This may be awkward, because the handwriting process must be constantly interrupted by looking at the computer screen for feedback. In latter case, the user must only look at the screen once in a while, when a writing unit (word or phrase) is completed and correct it as necessary.

Switching from mouse to pen input mode could be done by retractable pen refill action. When the refill is inside the pen (pen cannot write), it is used as a mouse. When writing is activated, the pen acts as a keyboard.

Other embodiments are within the scope of the following claims.

The holder need not be of the kind that includes an inkwell as described above but can be any kind of device that can hold the sensors. The holder can be a simpler pen cap, as shown earlier, or could be any other kind of device whether or not it mates with or caps the pen and whether or not it includes a clip or not. The holder could be incorporated into a clipboard or a notebook, for example.

The light in the pen can be fiber optics that deliver light to the tip and convey it in all directions around the pen in a disk-like pattern.

The invention claimed is:

1. A method comprising
   receiving, from a writing instrument, light including a modulation frequency,
   sensing the light at each of two or more sensors each comprising sensitive pixels and generating a sequence of signals representative of the sensed light,
   determining the modulation frequency from the sensor signals using a phase lock loop,
   sampling a sensor signal at the times triggered by the phase lock loop, and
   determining a location of the writing instrument based on the sampled sensor signals.

2. The method of claim 1 also comprising applying a technique to increase a stability of the positions.

3. The method of claim 2 in which the technique is based on optics.

4. The method of claim 2 in which the technique is based on algorithmic processing of the generated signals.

5. The method of claim 4 in which the algorithmic processing comprises mapping the signal response of the sensors based on parameters associated with the writing instrument.

6. The method of claim 4 in which the technique is also based on optics.

7. The method of claim 2 in which the technique comprises an algorithmic technique that also reduces an effect of variations of intensity of the light based on other than dimensional effects.

8. The method of claim 2 in which the technique is implemented in analog circuitry.

9. The method of claim 2 in which the technique is implemented in digital hardware.

10. The method of claim 1 in which optics are configured to enhance the uniformity of signal response of the sensors.

11. The method of claim 10 in which the optics comprise a spherical lens.

12. The method of claim 10 in which the optics comprise an aspheric lens.

13. The method of claim 10 in which the sensors comprise analog sensors.

14. The method of claim 1 in which
    the sensors comprise pixel arrays,
    the signals are grouped in frames, and
    the method also comprises processing of multiple frames to cancel noise and increase a stability of the positions.

15. The method of claim 1 also comprising
    chopping the sensor signals at the modulation frequency.

16. The method of claim 15 also comprising applying opposite gains to each of the chopped signals depending on the on or off state of the light conveyed from the writing instrument that corresponds to the signals.

17. The method of claim 16 in which the chopped signals are integrated over time.

18. The method of claim 15 also comprising varying the modulation frequency.

19. The method of claim 1 in which characteristics of the conveyed light are used for synchronization between the light source and the sensors.

20. The method of claim 1 in which the times triggered by the phase lock loop are during the duration of the strong short pulse.

21. The method of claim 1 in which calculating the positions comprises
    determining an integer pixel location that is closest to a location along the linear array at which the maximum intensity of light has been received from the writing instrument, and
    finding a fractional center of gravity of a subarray that is centered on the integer pixel location.

22. The method of claim 1 in which determining the location comprises calculating positions of the light on each of the sensors at a resolution that is higher than a pixel resolution of the sensor.

23. A method comprising
    receiving, from a writing instrument, light including periods of lower frequency modulation and bursts of higher frequency modulation,
    sensing the light at each of two or more sensors each comprising sensitive pixels and generating a sequence of signals representative of the sensed light,
    using the sensor signal associated with the higher frequency bursts to lock onto a modulation clock, and
    determining a location of the writing instrument based on the sampled sensor signals.

24. Apparatus comprising
    a sensor comprising a linear array of sensitive pixels configured to receive light from a moving writing instrument and generate signals representative of the light,
    optics that are configured to enhance optical power of the light received from the writing instrument and that enable calculation of a position of the light along the linear array of the sensor at a resolution that is higher than a pixel resolution of the sensor along the linear array, and
    algorithmic processes that enhance immunity of the calculation to instability in the signals and variations in the intensity of the received light,
    in which the processes determine the integral power of the overall signal distribution on the sensor and calculate a position of the light at a resolution that is higher than the resolution of the pixels based on half of the integral power position.

25. Apparatus comprising
    a sensor comprising a linear array of sensitive pixels configured to receive light from a moving writing instrument and generate signals representative of the light,
    optics that are configured to enhance optical power of the light received from the writing instrument and that enable calculation of a position of the light only along the linear array of the sensor at a resolution that is higher than a pixel resolution of the sensor along the linear array, and
    algorithmic processes that enhance the immunity of the calculation to instability in the signals and variations in the intensity of the received light,
    in which the processes use a polynomial approximation on the signal distribution and calculate a position of the light at a resolution that is higher than the resolution of the pixels as a function of approximated maximum.

26. The apparatus of claims 24 or 25 in which the optics comprise a ball lens or an aspherical lens.

27. The apparatus of claims 24 or 25 in which the optics include a single spherical lens and the lens and the corresponding sensor are together configured to enhance the optical power of light received at large angles or longer distances or at disadvantageous positions of the writing instrument.

28. The apparatus of claims 24 or 25 in which the optics include a special lens configured to enhance optical power of the light received from a location on the X-Y surface that is beyond a predetermined position.

29. The apparatus of claims 24 or 25 in which the optics include two cylindrical lenses, one nearer the sensor to project light horizontally onto the sensor, and the other positioned to collect light in the Z-axis dimension, the other lens having a body that is bent around the first lens.

30. The apparatus of claim 25 also including a calibration procedure to produce parameters to be used in combination with data from the sensors.

31. The apparatus of claim 30 in which the calibration parameters correct for non linearity of the sensors, and the algorithmic processes use a quasi triangulation technique to determine a position of the writing instrument.

32. The apparatus of claim 31 in which the calibration parameters correct for non linearity of the sensors and the algorithmic processes determine the position of the writing instrument using polynomial series, and coefficients in these polynomials are determined during the calibration procedure.

33. A method comprising
receiving light from a moving light source on a writing instrument as an indication of a location and path of the writing instrument on a two-dimensional writing surface,
sensing the light at each of two or more sensors each comprising a linear array of sensitive pixels and generating a sequence of signals representative of the sensed light, and
calculating from the signals positions of the light along the linear array of each of the two or more sensors at a resolution that is higher than a pixel resolution of the sensor by
determining the integral power of the overall signal distribution on the sensor, and
calculating a position of the light based on half of the integral power position.

34. A method comprising
receiving light from a moving light source on a writing instrument as an indication of a location and path of the writing instrument on a two-dimensional writing surface,
sensing the light at each of two or more sensors each comprising a linear array of sensitive pixels and generating a sequence of signals representative of the sensed light,
calculating from the signals positions of the light along the linear array of each of the two or more sensors at a resolution that is higher than a pixel resolution of the sensor using a polynomial approximation on the signal distribution and calculating the positions as a function of approximated maximum.

35. The method of claim 33 or 34 in which the calculating also includes using algorithmic processes to enhance the immunity of the signals to variations in the intensity of the received light.

36. An apparatus comprising
a sensor comprising a linear array of sensitive pixels configured to receive light from a writing instrument moving across an X-Y writing surface, the light including a modulation frequency,
a phase lock loop configured to determine the modulation frequency from signals generated by the sensor, and
optics that enable calculation of a position of the light along the linear array of the sensor at a resolution that is higher than a pixel resolution of the sensor along the linear array,
in which the sensor signal is sampled at times triggered by the phase lock loop.

37. An apparatus comprising
a sensor comprising a linear array of sensitive pixels configured to receive light from a writing instrument moving across an X-Y writing surface, the light including periods of lower frequency modulation and bursts of higher frequency modulation, and
optics that enable calculation of a position of the light only along the linear array of the sensor at a resolution that is higher than a pixel resolution of the sensor along the linear array,
in which the sensor signal associated with the higher frequency bursts is used to lock onto a modulation clock.

38. The apparatus of claim 36 in which the times triggered by the phase lock loop are during the duration of the strong short pulse.

39. The apparatus of claims 36 or 37 also including algorithmic processes that enhance the immunity of the signals to variations in the intensity of the received light caused by distance from or tilt of the writing instrument.

40. The apparatus of claims 36 or 37 in which the optics are configured to enhance optical power of the light received from the writing instrument.

* * * * *